United States Patent
Stolz et al.

(10) Patent No.: US 12,492,275 B2
(45) Date of Patent: Dec. 9, 2025

(54) PHOTO-CURABLE COMPOSITIONS CONTAINING HIGH REFRACTIVE INDEX MONOMERS FOR USE IN 3D PRINTING APPLICATIONS

(71) Applicant: Arkema France, Colombes (FR)

(72) Inventors: Yann Stolz, Exton, PA (US); Noemi Feillee, Verneuil en Halatte (FR)

(73) Assignee: Arkema France, Puteaux (FR)

( * ) Notice: Subject to any disclaimer, the term of this patent is extended or adjusted under 35 U.S.C. 154(b) by 820 days.

(21) Appl. No.: 17/641,847

(22) PCT Filed: Sep. 11, 2020

(86) PCT No.: PCT/IB2020/000754
§ 371 (c)(1),
(2) Date: Mar. 10, 2022

(87) PCT Pub. No.: WO2021/048628
PCT Pub. Date: Mar. 18, 2021

(65) Prior Publication Data
US 2024/0052081 A1    Feb. 15, 2024

Related U.S. Application Data

(60) Provisional application No. 62/899,182, filed on Sep. 12, 2019.

(51) Int. Cl.
| | | |
|---|---|---|
| C08F 226/12 | (2006.01) | |
| C08F 220/18 | (2006.01) | |
| C08F 220/30 | (2006.01) | |
| C08L 71/02 | (2006.01) | |
| B29C 64/129 | (2017.01) | |
| B33Y 70/10 | (2020.01) | |
| C08F 2/44 | (2006.01) | |
| C08F 2/50 | (2006.01) | |
| C09D 11/101 | (2014.01) | |

(52) U.S. Cl.
CPC .......... C08F 226/12 (2013.01); C08F 220/18 (2013.01); C08F 220/301 (2020.02); C08L 71/02 (2013.01); B29C 64/129 (2017.08); B33Y 70/10 (2020.01); C08F 2/44 (2013.01); C08F 2/50 (2013.01); C08F 2800/20 (2013.01); C09D 11/101 (2013.01)

(58) Field of Classification Search
USPC ........................................................ 524/854
See application file for complete search history.

(56) References Cited

U.S. PATENT DOCUMENTS

| | | |
|---|---|---|
| 5,496,682 A | 3/1996 | Quadir et al. |
| 6,117,612 A | 9/2000 | Halloran et al. |
| 6,283,997 B1 | 9/2001 | Garg et al. |
| 7,083,645 B2 | 8/2006 | Mentak |
| 7,271,283 B2 | 9/2007 | Chisholm et al. |
| 2002/0128417 A1 | 9/2002 | Mentak |
| 2004/0242720 A1 | 12/2004 | Chisholm et al. |
| 2005/0049376 A1 | 3/2005 | Chisholm et al. |
| 2005/0090575 A1 | 4/2005 | Chaput et al. |
| 2012/0172477 A1* | 7/2012 | Huang .................. C09J 133/14 522/79 |
| 2012/0267151 A1 | 10/2012 | Hojo et al. |
| 2013/0179215 A1 | 7/2013 | Foster et al. |
| 2014/0018474 A1 | 1/2014 | Zhou et al. |
| 2016/0235886 A1 | 8/2016 | Jiang et al. |
| 2018/0079923 A1 | 3/2018 | Umebayashi |
| 2019/0211219 A1 | 7/2019 | Kondo et al. |
| 2019/0352520 A1 | 11/2019 | Schwartz et al. |

FOREIGN PATENT DOCUMENTS

| | | | |
|---|---|---|---|
| CN | 107383253 A | 11/2017 | |
| CN | 107915485 A | 4/2018 | |
| CN | 107935591 A | 4/2018 | |
| CN | 108083818 A | 5/2018 | |
| CN | 108218440 A | 6/2018 | |
| CN | 108249930 A | 7/2018 | |
| DE | 102005058121 A1 | 3/2007 | |
| FR | 2835827 A1 | 8/2003 | |
| KR | 1020110137959 A * | 12/2011 | ............. C08L 33/08 |
| KR | 20190001791 A | 1/2019 | |
| KR | 20190001796 A | 1/2019 | |
| WO | WO2007048819 A1 | 5/2007 | |
| WO | WO2015168670 A1 | 11/2015 | |
| WO | WO2019023096 A1 | 1/2019 | |

OTHER PUBLICATIONS

Machine-generated English language translation of KR 10-2011-0137959, 14 pages, retrieved from ESPACENET on Jan. 7, 2025. (Year: 2011).*
Chemical Book Product Description: 48145-04-6 (2-Phenoxyethyl Acrylate), Copyright 2017, 4 pages, retrieved online: <URL: http://chemicalbook.com/ChemicalProduct Property-US_CB1113666.aspx> (Year: 2017).*
ThermoFisher Scientific Product Specification: Benzyl methacrylate, one page (Undated).*
Springer Materials Interactive: Refractive Index of Acrylic acid benzyl ester (pure), 3 pages, Copyright 2017, Springer-Verlag Berlin Heidelberg Release, printed from: https://materials.springer.com/interactive? (Year: 2017).*

(Continued)

*Primary Examiner* — Fred M Teskin
(74) *Attorney, Agent, or Firm* — Christopher R. Lewis

(57) ABSTRACT

Disclosed are high refractive index monomers for ceramic/metal 3D printing applications. The compositions disclosed herein have a higher refractive index and thus better resolution and lower scattering of the light when employed in a composition to deposit ceramic or metallic particles. The disclosed compositions also include low refractive cross-linkers selected for their good thermal decomposition and reactivity to provide good cohesion during the 3D printing.

18 Claims, No Drawings

(56) References Cited

OTHER PUBLICATIONS

"Stereolithography Using Compositions Containing Ceramic Powders" Hongmei Liao; Graduate Department of Chemical Engineering & Applied Chemistry University of Toronto, 1997 pp. 1-170.
"Solid Freebody Forming of Ceramics From Polymerizable Slurry"; Kevin Stuffle, Anthony Mulligan, Paul Calvert and John Lombardi—ACR, Tuscan Arizona; Arizona Materials Laboratories, pp. 60-63.
"Photopolymerization Monitoring of Ceramic Sterolithography Resins by FTIR Methods"; Jan. 2005, vol. 40, Issue 1. pp. 71-76; K.C. Wu & J.W. Halloran.

* cited by examiner

PHOTO-CURABLE COMPOSITIONS CONTAINING HIGH REFRACTIVE INDEX MONOMERS FOR USE IN 3D PRINTING APPLICATIONS

CROSS-REFERENCE TO RELATED APPLICATIONS

This application is a U.S. national stage application under 35 U.S.C. § 371 of international application number PCT/IB2020/000754, filed Sep. 11, 2020, which claims priority to U.S. patent application No. 62/899,182, filed Sep. 12, 2019.

FIELD OF THE INVENTION

The present disclosure provides photo-curable compositions comprising monomers having a high refractive index, a cross-linker and a plasticizer. In particular, the photo-curable compositions provide a resin base to which additional components are added for producing inks for 3D printing. The inks disclosed have excellent cohesion during printing and excellent thermal decomposition properties.

BACKGROUND OF THE INVENTION

Three-dimensional ("3D") printing composites made from organic resins and fillers (e.g., ceramic or metal particles) are finding increasing use in complex manufacturing applications such as stereolithographic (SLA) and digital light processing (DLP) printers. For both SLA and DLP, a vat of photoreactive liquid resin is selectively exposed to light in order to form very thin solid layers that stack up to create one solid object. SLA printers use two motors, known as galvanometers or galvos, (one on the X axis and one on the Y axis) to rapidly aim a laser beam across the print area, solidifying resin as it goes along. This process breaks down the design, layer by layer, into a series of points and lines that are given to the galvos as a set of coordinates. DLP printers use a digital projector screen to flash a single image of each layer across the entire platform at once. Because the projector is a digital screen, the image of each layer is composed of square pixels, resulting in a layer formed from small rectangular bricks called voxels. Regardless of its application, both SLA and DLP printers employ light to polymerize the resin thereby securing the fillers in desired locations.

Using light to polymerize the resins requires precise control of refraction and attenuation. The refractive index determines how much the path of light is bent, or refracted, when entering a material. Attenuation or, in some contexts, extinction is the gradual loss of light's flux intensity through a medium. For instance, as dark glasses attenuate sunlight, resins stored in dark glass do not polymerize.

However, some fillers, in particular ceramic and metal fillers, have unique refractive properties when compared to the broad spectrum of composite materials. Specifically, fillers having high refractive indexes cause light to bend and scatter when exposed to such materials. As a result, SLA and DLP production techniques are not as effective at shaping pieces using ceramic and metallic fillers. For example, the development of a hollowed body or very sharp edges are difficult to construct with such reflective fillers.

Due to the high refractive index contrast between the formulation (binder) and the particles (filler), strong scattering is usually experienced. This scattering limits the light intensity and thus results in significant printing constraints (e.g., specific light exposure, low resolution) as well as constraints concerning the selected fillers, for example ceramic powders. For example, ceramic with a refractive index higher than 2.16, (i.e., Zirconia), is considered impossible or extremely complicated to print. Simply put, the high refractive index metal and ceramic fillers cause UV light to scatter in uncontrolled directions, polymerizing undesired sections of the resin/filler mix, and potentially pushing/pulling fillers out of their desired location. As a result, when the final product is cast or sintered, the resulting metal or ceramic product lacks sharp edges or desired hollow bodies.

U.S. Pat. No. 6,117,612 discloses that photocurable ceramic resins having solids loadings in excess of 40 volume percent and a viscosity of less than 3000 mPa·s are suitable for multi-layer fabrication of green ceramic parts by stereolithography and similar techniques. The green ceramic parts, which may be of traditional ceramic materials, sinterable metals, or combinations thereof, exhibit low shrinkage upon firing or sintering, and may be used for such applications as rapid prototyping, biocompatible ceramic parts, ceramic cores for investment casting, and ceramic molds for metal casting.

Simply increasing the refractive index of the binder, however, doesn't solve the problem as most higher refractive index systems present poor decomposition, high viscosity and/or toxicity and/or pollution concerns. As a result, there is a need in the art for a binder resin suitable for 3D printing applications that has a high refractive index to control the potential scatter, a high attenuation rate to mute any scatter that does occur, and a high decomposition rate to reduce the prevalence of ash or soot being left behind after sintering.

SUMMARY OF THE INVENTION

Disclosed herein are photo-curable compositions for use in a composition suitable for three-dimensional printing, comprising, consisting essentially of, or consisting of: a. a monomer composition comprising at least one monomer having a refractive index of at least 1.49, in particular at least 1.5; b. a cross-linker; and c. a plasticizer.

In another aspect, disclosed herein are photo-curable ink compositions suitable for use in 3D printing, the ink composition comprising, consisting essentially of, or consisting of: a photo-curable composition according to the invention; a photo-initiator; scaffold particles; and a dispersant.

In yet another aspect there is provided a method of making an inorganic structure, in particular a ceramic structure, the method comprising (i) obtaining a photo-curable ink composition according to the invention; (ii) polymerizing and 3D-printing (preferably simultaneously) at least a portion of the photo-curable ink composition to generate a pre-inorganic polymer, in particular a pre-ceramic polymer; and (iii) thermally treating at least a portion of the pre-inorganic polymer, in particular at least a portion of the pre-ceramic polymer, to produce an inorganic structure, in particular ceramic structure.

DETAILED DESCRIPTION OF THE INVENTION

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

When the phrase "up to" is used in connection with an amount or quantity, it is to be understood that the amount is at least a detectable amount or quantity. For example, a material present in an amount "up to" a specified amount can be present from a detectable amount and up to and including the specified amount.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, digital light processing, gel deposition and other additive manufacturing techniques now known in the art or that may be known in the future that use a build material or ink to fabricate three-dimensional objects.

Compositions

Disclosed herein are photo-curable resin compositions suitable for use in 3D printing compositions that have a high refractive index that, when printed and cured (preferably simultaneously), provide printed objects that also exhibit high refractive indices. The high refractive index monomers may be combined with other monomers, oligomers, and/or polymers to form radiation curable compositions. Also provided herein are low viscosity high refractive index monomers useful in combinations with higher viscosity oligomers and optionally other monomers to provide curable compositions.

Also provided herein is a process of printing 3D objects with the compositions disclosed herein.

As used herein, "(meth)acrylate" is inclusive of both acrylate and methacrylate functionality.

As used herein "high refractive index" means a refractive index equal to or greater than about 1.47, in particular equal to or greater than about 1.48, more particularly equal to or greater than about 1.49, even more particularly equal to or greater than about 1.50. The term "about" in connection with the refractive index means a variation of +/−2% around the indicated value for the refractive index.

The term "refractive index" is defined herein as the absolute refractive index of a material (e.g., a monomer, a photo-curable composition or the polymerized product thereof) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

As intended herein, a "resin" means a composition capable of being polymerized or cured, further polymerized or cured, or crosslinked. Resins may include monomers, oligomers, prepolymers, or mixtures thereof.

As used herein, the term "ethylenically unsaturated" means a monomer that comprises a polymerizable carbon-carbon double bond. A polymerizable carbon-carbon double bond is a carbon-carbon double bond that can react with another carbon-carbon double bond in a polymerization reaction. A polymerizable carbon-carbon double bond is generally comprised in an acryloyl (—C(=O)—CH=CH$_2$), methacryloyl (—C(=O)—C(CH$_3$)=CH$_2$), vinyl (—CH=CH$_2$) or allyl (—CH$_2$—CH=CH$_2$) group. The carbon-carbon double bonds of a phenyl ring are not considered as polymerizable carbon-carbon double bonds.

As used herein the term "monoethylenically unsaturated" means a monomer that comprises only one polymerizable carbon-carbon double bond.

As used herein the term "aryl" means an aromatic ring having only carbon ring atoms or an aromatic system comprising more than one aromatic ring. When more than one aromatic rings are present, they may be fused together and/or fused to a non-aromatic ring or connected by a bond. Examples of aryl include phenyl, biphenyl, naphthyl, anthracenyl, phenanthrenyl and fluorenyl. An aryl may be unsubstituted or substituted with 0 to 5 substituents independently chosen from halogen, alkyl, alkoxy, cycloalkyl, aryl, alkylaryl, aryloxy, heteroaryl, thioalkyl, haloalkyl, haloalkoxy.

As used herein, a dash ("—") that is not between two letters or symbols is used to indicate a point of attachment for a substituent. For example, (C$_1$-C$_4$ alkyl)S— is attached through the sulfur atom.

As used herein, "alkyl" includes both branched and straight chain saturated aliphatic hydrocarbon groups. An alkyl may have 1 to 20, in particular 1 to 12, more particularly 1 to 6 carbon atoms. A "C$_1$-C$_6$ alkyl" means an alkyl having 1 to 6 carbon atoms. Examples of alkyl include, but are not limited to, methyl, ethyl, n-propyl, isopropyl, n-butyl, 3-methylbutyl, t-butyl, n-pentyl, and sec-pentyl, hexyl.

The term «alkylene» means a divalent saturated aliphatic hydrocarbon group. An alkylene may be linear or branched. An alkylene may have 1 to 20, in particular 1 to 12, more particularly 1 to 6 carbon atoms. A «C1-C6 alkylene» means an alkylene having 1 to 6 carbon atoms.

As used herein "alkoxy" indicates an alkyl group as defined above attached through an oxygen bridge (—O—). A "$C_1$-$C_6$ alkoxy" means an alkoxy having 1 to 6 carbon atoms. Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

As used herein "aryloxy" indicates an aryl group as defined above attached through an oxygen bridge (—O—). An example of an aryloxy is phenoxy.

As used herein "haloalkyl" indicates an alkyl group as defined above substituted with 1 or more halogen atoms, generally up to the maximum allowable number of halogen atoms. A "$C_1$-$C_6$ haloalkyl" means a haloalkyl having 1 to 6 carbon atoms. Examples of haloalkyl include, but are not limited to, tribromomethyl, dibromomethyl, 2-bromoethyl, and pentabromoethyl.

"Haloalkoxy" indicates a haloalkyl group as defined above attached through an oxygen bridge. A "$C_1$-$C_6$ haloalkoxy" means a haloalkoxy having 1 to 6 carbon atoms.

As used herein "thioalkyl" indicates an alkyl group as defined above attached through an thioether bridge (—S—). A "$C_1$-$C_6$ thioalkyl" means an thioalkyl having 1 to 6 carbon atoms.

"Halo" or "halogen" as used herein refers to fluoro, chloro, bromo, or iodo.

As used herein, "heteroaryl" indicates a stable aromatic ring which contains from 1 to 3, or preferably from 1 to 2, heteroatoms chosen from N, O, and S, with remaining ring atoms being carbon, or a stable bicyclic or tricyclic system containing at least one 5 to 7 membered aromatic ring which contains from 1 to 3, or preferably from 1 to 2, heteroatoms chosen from N, O, and S, with remaining ring atoms being carbon. When the total number of S and O atoms in the heteroaryl group exceeds 1, these heteroatoms are not adjacent to one another. Examples of heteroaryl groups include, but are not limited to, benzo[d]thiazolyl, benzo[d]oxazolyl, benzofuranyl, benzothiophenyl, benzoxadiazolyl, carbazolyl, dihydrobenzodioxynyl, furanyl, imidazolyl, indolyl, isoxazolyl, oxazolyl, N-phenothiazinyl, pyranyl, pyrazinyl, pyrazolopyrimidinyl, pyrazolyl, pyridizinyl, pyridyl, pyrimidinyl, pyrrolyl, quinolinyl, tetrazolyl, thiazolyl, thienylpyrazolyl, thiophenyl, and triazolyl.

The term «alkylaryl» means an alkyl substituted by an aryl group. Examples of an alkylaryl group are benzyl (—$CH_2$-Phenyl) and cumyl (—$C(CH_3)_2$-Phenyl).

Photo-curable compositions disclosed herein for use in a composition suitable for three-dimensional printing, comprise, consist essentially of, or consist of: a. a monomer composition comprising at least one monomer having a refractive index of at least 1.49, in particular at least 1.5; b. a cross-linker; and c. a plasticizer.

In one embodiment, the photo-curable composition has a refractive index above about 1.47, in particular above about 1.48, more particularly above about 1.49, even more particularly above about 1.50.

Photo-curable compositions disclosed herein for use in a composition suitable for three-dimensional printing may comprise, consist essentially of, or consist of: a. a monomer composition comprising at least one monomer having a refractive index of at least 1.49, in particular at least 1.5, wherein the at least one monomer is selected from the group consisting of i. at least one monomer selected from the group consisting of poly(oxy-1,2-ethanediyl), alpha-(1-oxo-2-propen-1-yl)-omega-(4-(1-methyl-1-phenylethyl)phenoxy)-, N-vinyloxazole, and N-vinylcarbazole, ii. at least one monomer of Formula I

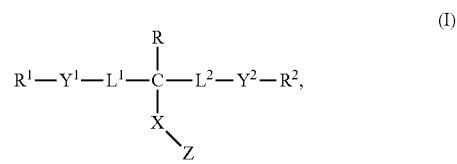

wherein, Z is an ethylenically unsaturated group; X is O, S, or NH; $L^1$ and $L^2$ are each independently $C_1$-$C_3$ alkylene, —($C_1$-$C_3$ alkylene)-S—($C_1$-$C_3$ alkylene)-, or —($C_1$-$C_3$ alkylene)-O—($C_1$-$C_3$ alkylene)-; R is hydrogen or $C_1$-$C_6$ alkyl; $R^1$ and $R^2$ are each independently aryl, aryl($C_1$-$C_6$ alkylene)-, heteroaryl, or heteroaryl($C_1$-$C_6$ alkylene)-, each of which group is substituted with 0 to 5 substituents independently selected from halogen, $C_1$-$C_4$ alkyl, $C_1$-$C_4$ alkoxy, ($C_1$-$C_4$ alkyl)S—, $C_1$-$C_4$ haloalkyl, and $C_1$-$C_4$ haloalkoxy; and $Y^1$ and $Y^2$ are each independently O, S, NH, or N, iii. at least one monomer of Formula II

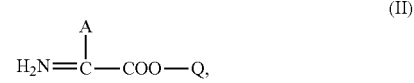

wherein, A is H or $CH_3$, and Q is a moiety that includes at least one substituted or unsubstituted aromatic ring or at least one substituted or unsubstituted heteroaromatic ring, and iv. at least one (meth)acrylate monomer comprising a non-aromatic polycyclic moiety having at least 3 rings; b. a cross-linker; and c. a plasticizer, wherein the photo-curable composition has a refractive index above about 1.47, in particular above about 1.48, more particularly above about 1.49, even more particularly above about 1.50.

The monomer compositions disclosed herein have a high refractive index and, thus, comprise at least one monomer having a refractive index of at least 1.49, in particular at least 1.5.

In one embodiment, the monomer having a refractive index of at least 1.49, in particular at least 1.5, is a monoethylenically unsaturated monomer.

In one embodiment, the monomer having a refractive index of at least 1.49, in particular at least 1.5, comprises at least one moiety selected from an optionally substituted aryl, an optionally substituted heteroaryl, a non-aromatic polycyclic moiety, a sulfur atom, and combinations thereof.

In one embodiment, the monomer having a refractive index of at least 1.49, in particular at least 1.5, is at least one selected from the group consisting of poly(oxy-1,2-ethanediyl), alpha-(1-oxo-2-propen-1-yl)-omega-(4-(1-methyl-1-phenylethyl)phenoxy)-, N-vinyloxazole, and N-vinylcarbazole.

In particular, the monomer having a refractive index of at least 1.49, in particular at least 1.5, is poly(oxy-1,2-ethanediyl), alpha-(1-oxo-2-propen-1-yl)-omega-(4-(1-methyl-1-phenylethyl)phenoxy)- and may have the following structure:

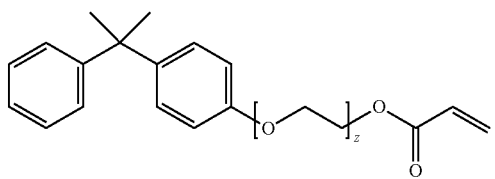

wherein z is from 1 to 10, in particular 1 to 3, more particularly 1 to 2.

In one embodiment, the monomer having a refractive index of at least 1.49, in particular at least 1.5, is at least monomer of Formula I

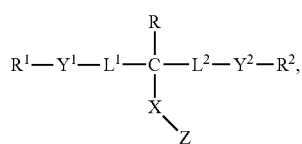

wherein, Z is an ethylenically unsaturated group; X is O, S, or NH; $L^1$ and $L^2$ are each independently $C_1$-$C_3$ alkylene, —($C_1$-$C_3$ alkylene)-S—($C_1$-$C_3$ alkylene)-, or —($C_1$-$C_3$ alkylene)-O—($C_1$-$C_3$ alkylene)-; R is hydrogen or $C_1$-$C_6$ alkyl; $R^1$ and $R^2$ are each independently aryl, aryl($C_1$-$C_6$ alkylene)-, heteroaryl, or heteroaryl($C_1$-$C_6$ alkylene)-, each of which group is substituted with 0 to 5 substituents independently selected from halogen, $C_1$-$C_4$ alkyl, $C_1$-$C_4$ alkoxy, ($C_1$-$C_4$ alkyl)S—, $C_1$-$C_4$ haloalkyl, and $C_1$-$C_4$ haloalkoxy; and $Y^1$ and $Y^2$ are each independently O, S, NH, or N.

Z is an ethylenically unsaturated group, for example, acryloyl, methacryloyl, vinyl, allyl, and the like; more specifically acryloyl and methacryloyl.

The $L^1$ and $L^2$ groups may each independently be $C_1$-$C_3$ alkylene, more specifically $C_1$-$C_2$ alkylene, and yet more specifically $C_1$ alkylene. Moreover, the $L^1$ and $L^2$ groups may each independently be —($C_1$-$C_3$ alkylene)-S—($C_1$-$C_3$ alkylene)-, or —($C_1$-$C_3$ alkylene)-O—($C_1$-$C_3$ alkylene)-; more specifically, —($C_1$ alkylene)-S—($C_2$ alkylene)-, —($C_2$ alkylene)-S—($C_1$ alkylene)-, —($C_1$ alkylene)-O—($C_2$ alkylene)-, or —($C_2$ alkylene)-O—($C_1$ alkylene)-; and the like.

The R group can be hydrogen or $C_1$-$C_6$ alkyl, more specifically hydrogen or $C_1$-$C_3$ alkyl, and yet more specifically hydrogen.

The X group can be O, S, or NH; more specifically O or S, and yet more specifically O.

Suitable aryl groups for $R^1$ and $R^2$ include, for example, phenyl and naphthyl groups, each of which group is substituted with 0 to 5 substituents independently chosen from halogen, $C_1$-$C_4$ alkyl, $C_1$-$C_4$ alkoxy, ($C_1$-$C_4$ alkyl)S—, $C_1$-$C_4$ haloalkyl, and $C_1$-$C_4$ haloalkoxy. Exemplary $R^1$ and $R^2$ groups include phenyl, 3-bromophenyl, 4-bromophenyl, 2,4,6-tribromophenyl, naphthyl, the heteroaryl groups described herein, specifically benzo[d]thiazolyl, benzo[d]oxazolyl, N-phenothiazinyl, and the like.

The $Y^1$ and $Y^2$ groups can each independently be O, S, NH, or N, more specifically O or S, and yet more specifically S. Optionally, when $Y^1$ and $Y^2$ are both S at least one of $R^1$ and $R^2$ is heteroaryl or heteroaryl($C_1$-$C_6$ alkylene) substituted as previously described. In one embodiment, when $Y^1$ and $Y^2$ are both S, one or both of $L^1$ and $L^2$ can be —($C_1$-$C_3$ alkylene)-S—($C_1$-$C_3$ alkylene)-, or —($C_1$-$C_3$ alkylene)-O—($C_1$-$C_3$ alkylene)-.

When $Y^1$ or $Y^2$ is N, then each corresponding combination $R^1$—$Y^1$ or $R^1$—$Y^2$ is independently an N-containing heteroaryl. For the monomers of Formula (I) where the combination $R^1$—$Y^1$ or $R^2$—$Y^2$ is an N-containing heteroaryl, the nitrogen of the heteroaryl is covalently bonded to the $L^1$ or $L^2$ group respectively. Suitable N-containing heteroaryls include, for example, N-10H-phenothiazinyl, N-1H-indolyl, benzimidazolyl, imidazolyl, N-9,10-dihydroacridinyl, and the like.

Specific examples of high refractive index monomers of formula I include 1,3-bis(2-bromophenoxy)propan-2-yl acrylate, 1,3-bis(4-bromophenoxy)propan-2-yl acrylate, 1,3-bis(3-bromophenoxy)propan-2-yl acrylate, 1,3-bis(4-methylphenylthio)-2-propyl acrylate, 1,3-bis(phenoxy)propan-2-yl acrylate, 1,3-bis(2-mercaptobenzothiazoyl)-2-propyl acrylate or 1,3-bis(benzo[d]thiazol-2-ylthio)propan-2-yl acrylate, 1,3-bis(2,4,6-tribromophenoxy)-2-propyl acrylate, 1,3-bis(phenylthio)propan-2-yl acrylate, 1,3-bis(4-bromophenylthio)propan-2-yl acrylate, 1,3-bis(3-bromophenylthio)propan-2-yl acrylate, 1,3-bis(2,4,6-tribromophenylthio)propan-2-yl acrylate, 1,3-di(10H-phenothiazin-10-yl)propan-2-yl acrylate, 1,3-bis(2-(phenylthio)ethylthio)propan-2-yl acrylate, 1-phenoxy-3-(phenylthio)propan-2-yl acrylate, 1-(4-chlorophenoxy)-3-(phenylthio)propan-2-yl acrylate, 1-(4-bromophenoxy)-3-(4-bromophenylthio)propan-2-yl acrylate, 1-(2,4,6-tribromophenoxy)-3-(2,4,6-tribromophenylthio)propan-2-yl acrylate, 1-(2,4-dibromophenoxy)-3-(2,4-dibromophenylthio)propan-2-yl acrylate, and the like, including the corresponding unnamed methacrylates and acrylates, and including mixtures thereof.

High refractive index monomers of Formula I can be synthesized according to the methods disclosed in U.S. Pat. No. 7,271,283, which is incorporated herein by reference.

In one embodiment, the monomer having a refractive index of at least 1.49, in particular at least 1.5, is at least one monomer of Formula II

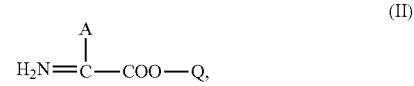

wherein, A is H or $CH_3$, and Q is a moiety that includes at least one substituted or unsubstituted aromatic ring or at least one substituted or unsubstituted heteroaromatic ring. The optional substituents of the aromatic or heteroaromatic ring may be selected from one or more of alkyl, alkoxy, cycloalkyl, halogen, aryl, alkylaryl, aryloxy, and heteroaryl.

In one embodiment, Q may correspond to —Ar, -Alk-Ar, -Alk-O—Ar, -Alk-S—Ar or —$(CR_aR_b—CR'_aR'_b—O)_n$—Ar wherein
   Ar is an optionally substituted aryl or an optionally substituted heteroaryl, in particular Ar is an optionally substituted phenyl, more particularly Ar is a phenyl optionally substituted one or more substituents selected from methyl, ethyl, propyl, isopropyl, nonyl, methoxy, ethoxy, cyclohexyl, Cl, Br, phenyl, benzyl, cumyl and phenoxy;
   Alk is a linear or branched alkylene optionally substituted by OH or aryl, in particular Alk is a linear C1-C10 alkylene, more particularly a linear C1-C6 alkylene, even more particularly C2-C3 alkylene, optionally substituted by OH or aryl;

each $R_a$, $R_b$, $R'_a$ and $R'_b$ is independently H or alkyl, in particular H;

n is 2 to 100, in particular 2 à 10.

Representative substituents for Q include, without limitation: ethylene glycol phenyl ether, poly(ethylene glycol) phenyl ether, phenyl, 2-ethylphenoxy, hexylphenoxy, benzyl, 2-phenylethyl, 4-methylphenyl, 4-methylbenzyl, 2-(2-methyphenyl)ethyl, 2-(3-methylphenyl)ethyl methacrylate, 2-(4-methylphenyl)ethyl, 2-(4-propylphenyl)ethyl, 2-(4-(1-methylethyl)phenyl)ethyl, 2-(4-methoxyphenyl)ethyl, 2-(4-chlorophenyl)ethyl, 2-(2-chlorophenyl)ethyl, 2-(3-chlorophenyl)ethyl, 2-(4-chlorophenyl)ethyl, 2-(4-bromophenyl)ethyl, 2-(3-phenylphenyl)ethyl, 2-(4-phenylphenyl)ethyl, 2-(4-benzylphenyl)ethyl and the like.

Suitable aryl (meth)acrylate monomers represented by Formula II include, for example: ethylene glycol phenyl ether acrylate (EGPEA), poly(ethylene glycol) phenyl ether acrylate (polyEGPEA), phenyl methacrylate, 2-ethylphenoxy methacrylate, 2-ethylphenoxy acrylate, hexylphenoxy methacrylate, hexylphenoxy acrylate, benzyl methacrylate, 2-phenylethyl methacrylate, 4-methylphenyl methacrylate, 4-methylbenzyl methacrylate, 2-(2-methylphenyl)ethyl methacrylate, 2-(3-methylphenyl)ethyl methacrylate, 2-(4-methylphenyl)ethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-phenylphenyl)ethyl methacrylate), 2-(4-benzylphenyl)ethyl methacrylate, 2-(phenylphenoxy)ethyl acrylate, 2-phenoxyethyl acrylate, 2-(phenylthio)ethyl (meth)acrylate, (2-phenoxy-2-phenyl)ethyl (meth)acrylate, (2-phenyl-2-phenylthio)ethyl (meth)acrylate, 2-, 3-, and 4-bromophenyl (meth)acrylate, 2,4,6-tribromophenyl (meth)acrylate, tetrabromophenyl (meth)acrylate, pentabromophenyl (meth)acrylate, 2-, 3-, and 4-bromobenzyl (meth)acrylate, 2,4,6-tribromobenzyl (meth)acrylate, tetrabromobenzyl (meth)acrylate, pentabromobenzyl (meth)acrylate, 3-phenyl-2-hydroxypropyl (meth)acrylate, ortho-biphenyl (meth)acrylate, 3-(2,4-dibromophenyl)-2-hydroxypropyl (meth)acrylate, (2-hydroxy-3-phenoxy)propyl (meth)acrylate and the like, including the corresponding unnamed methacrylates and acrylates, and including mixtures thereof.

High refractive index monomers of Formula II can be synthesized according to the methods disclosed in U.S. Pat. No. 7,083,645, which is incorporated herein by reference.

In one embodiment, the monomer having a refractive index of at least 1.49, in particular at least 1.5, is at least one (meth)acrylate comprising a non-aromatic polycyclic moiety having at least 3 rings.

In particular, the non-aromatic polycyclic moiety may comprise at least three rings that are condensed or fused, in particular the non-aromatic polycyclic moiety may be selected from a tricyclodecyl group, a dicyclopentadienyl group or a dicyclodihydropentadienyl group.

In some embodiments, the monomer having a refractive index of at least 1.49, in particular at least 1.5, corresponds to formula III:

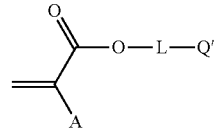

(III)

wherein

A is H or Me,

L is a bond, C1-C3 alkylene or $-(CR_cR_d-CR'_cR'_d-O)_m-$, in particular L is a bond or $-CH_2-$;

each $R_c$, $R_d$, $R'_c$ and $R'_d$ is independently H or alkyl, in particular H;

m is 2 to 10; and

Q' corresponds to one of the following formulae:

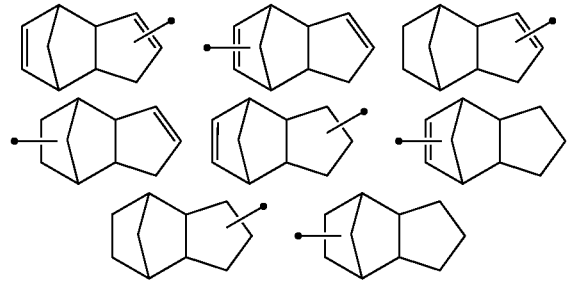

wherein the symbol ● corresponds to the point of attachment to linker L.

In some embodiments, the monomer having a refractive index of at least 1.49, in particular at least 1.5, is selected from the group consisting of mono(meth)acrylate of tricyclodecane methanol, mono(meth)acrylate of tricyclodecane dimethanol, mono(meth)acrylate of dicyclopentadienyl and combinations thereof.

In particular, the monomer according to formula III may be mono(meth)acrylate of tricyclodecane methanol of formula

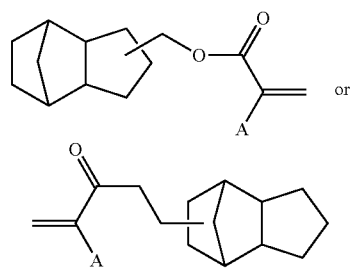

or wherein A is H or $CH_3$.

The monomer composition may further comprise additional (meth)acrylate monomers such as methyl (meth)acrylate, butyl (meth)acrylate, 2-hydroxyethyl (meth)acrylate, cyclohexyl (meth)acrylate, tetrahydrofurfuryl (meth)acrylate, dicyclopentanyl (meth)acrylate, dicyclopentenyl (meth)acrylate, 3,3,5 trimethyl cyclohexyl acrylate, bicyclophenoxyethyl acrylate, and the like, and mixtures thereof.

In certain embodiments, the high refractive index monomer is selected from the group consisting of poly(oxy-1,2-ethanediyl), alpha-(1-oxo-2-propen-1-yl)-omega-(4-(1-methyl-1-phenylethyl)phenoxy)-, N-vinyloxazole, N-vinylcarbazole, 2-phenylphenoxyethyl acrylate, 2-phenoxyethyl acrylate and mixtures thereof.

In one embodiment, the high refractive index monomer is 2-hydroxy-3-phenoxy)propyl (meth)acrylate.

The monomer composition is typically present in the photo-curable compositions disclosed herein in an amount ranging of from about 5 wt. % to about 40 wt. %, in particular from about 20 wt. % to about 40 wt. %, based on the total weight of the photo-curable composition. In certain embodiments, the monomer composition ranges in amounts from about 20 wt. % to about 37.5 wt. %, from about 20 wt. % to about 35 wt. %, from about 20 wt. % to about 32.5 wt. %, from about from about 20 wt. % to about 30 wt. %, from about 20 wt. % to about 27.5 wt. %, from about 20 wt. % to about 25 wt. %, from about 20 wt. % to about 22.5 wt. %, from about 22.5 wt. % to about 40 wt. %, from about 22.5 wt. % to about 37.5 wt. %, from about 22.5 wt. % to about 35 wt. %, from about from about 22.5 wt. % to about 32.5 wt. %, from about 22.5 wt. % to about 30 wt. %, from about 22.5 wt. % to about 27.5 wt. %, from about 22.5 wt. % to about 25 wt. %, from about 25 wt. % to about 40 wt. %, from about 25 wt. % to about 37.5 wt. %, from about 25 wt. % to about 35 wt. %, from about from about 25 wt. % to about 32.5 wt. %, from about 25 wt. % to about 30 wt. %, from about 25 wt. % to about 27.5 wt. %, from about 27.5 wt. % to about 40 wt. %, from about 27.5 wt. % to about 37.5 wt. %, from about 27.5 wt. % to about 35 wt. %, from about from about 27.5 wt. % to about 32.5 wt. %, from about 27.5 wt. % to about 30 wt. %, from about 30 wt. % to about 40 wt. %, from about 30 wt. % to about 37.5 wt. %, from about 30 wt. % to about 35 wt. %, from about from about 30 wt. % to about 32.5 wt. %, from about 32.5 wt. % to about 40 wt. %, from about 32.5 wt. % to about 37.5 wt. %, from about 32.5 wt. % to about 35 wt. %, from about 35 wt. % to about 40 wt. %, from about 35 wt. % to about 37.5 wt. %, and from about 37.5 wt. % to about 40 based on the total weight of the photo-curable composition. In certain embodiments, the monomer composition ranges in amounts from about 5 wt. % to about 25 wt. %, from about 7 wt. % to about 22 wt. %, from about 10 wt. % to about 20 wt. %, from about from about 12 wt. % to about 15 wt. %, based on the total weight of the photo-curable composition.

The high refractive index monomer is typically present in the photo-curable compositions disclosed herein in an amount ranging of from about 5 wt. % to about 40 wt. %, in particular from about 20 wt. % to about 40 wt. % based on the total weight of the photo-curable composition. In certain embodiments, the high refractive index monomer ranges in amounts from about 20 wt. % to about 37.5 wt. %, from about 20 wt. % to about 35 wt. %, from about 20 wt. % to about 32.5 wt. %, from about from about 20 wt. % to about 30 wt. %, from about 20 wt. % to about 27.5 wt. %, from about 20 wt. % to about 25 wt. %, from about 20 wt. % to about 22.5 wt. %, from about 22.5 wt. % to about 40 wt. %, from about 22.5 wt. % to about 37.5 wt. %, from about 22.5 wt. % to about 35 wt. %, from about from about 22.5 wt. % to about 32.5 wt. %, from about 22.5 wt. % to about 30 wt. %, from about 22.5 wt. % to about 27.5 wt. %, from about 22.5 wt. % to about 25 wt. %, from about 25 wt. % to about 40 wt. %, from about 25 wt. % to about 37.5 wt. %, from about 25 wt. % to about 35 wt. %, from about from about 25 wt. % to about 32.5 wt. %, from about 25 wt. % to about 30 wt. %, from about 25 wt. % to about 27.5 wt. %, from about 27.5 wt. % to about 40 wt. %, from about 27.5 wt. % to about 37.5 wt. %, from about 27.5 wt. % to about 35 wt. %, from about from about 27.5 wt. % to about 32.5 wt. %, from about 27.5 wt. % to about 30 wt. %, from about 30 wt. % to about 40 wt. %, from about 30 wt. % to about 37.5 wt. %, from about 30 wt. % to about 35 wt. %, from about from about 30 wt. % to about 32.5 wt. %, from about 32.5 wt. % to about 40 wt. %, from about 32.5 wt. % to about 37.5 wt. %, from about 32.5 wt. % to about 35 wt. %, from about 35 wt. % to about 40 wt. %, from about 35 wt. % to about 37.5 wt. %, and from about 37.5 wt. % to about 40 based on the total weight of the photo-curable composition. In certain embodiments, the high refractive index monomer ranges in amounts from about 5 wt. % to about 25 wt. %, from about 7 wt. % to about 22 wt. %, from about 10 wt. % to about 20 wt. %, from about from about 12 wt. % to about 15 wt. %, based on the total weight of the photo-curable composition.

The photo-curable compositions disclosed herein comprise a cross-linking compound, also referred to herein as a "cross-linker" or a "cross-linking agent." The cross-linker functions to react with and cure the monomer via polymerization. A "cross-link" is a bond that links one polymer chain to another. Cross-link bonds can be covalent bonds or ionic bonds. When polymer chains are linked together by cross-links, they lose some of their ability to move as individual polymer chains. Cross-links are the characteristic property of thermosetting plastic materials. In most cases, cross-linking is irreversible.

Examples of cross-linkers include, but are not limited to, an isocyanate cross-linking agent, an epoxy crosslinking agent, a silicone crosslinking agent, an oxazoline crosslinking agent, an aziridine crosslinking agent, a silane cross-linking agent, an alkyl etherified melamine crosslinking agent, a peroxide, triallyl cyanurate, triallyl isocyanurate, polybutadiene dimethacrylates, polybutadiene diacrylates, divinylbenzene, 1,2-bis(vinylphenyl)ethane, vinylbenzyl ether compounds, vinyl ether compounds, allyl ether compounds, vinylphenyl monomers, vinyl monomers, allyl monomers, (meth)acrylate monomers and similar compounds containing two or more carbon-carbon bond forming moieties per molecule.

In one embodiment, the cross-linker may be a compound having at least two functional groups capable of reacting with the monomer(s) of the monomer composition. In one embodiment, the cross-linker has at least two ethylenically unsaturated groups, in particular at least two ethylenically unsaturated groups selected from acrylate, methacrylate, allyl, vinyl, vinyl ether, allyl ether, and combinations thereof, more particularly at least two ethylenically unsaturated groups selected from acrylate and methacrylate.

In one embodiment, the cross-linker may be selected from ethylene glycol di(meth)acrylate, 1,2-propanediol di(meth)acrylate, 1,3-propanediol di(meth)acrylate, 1,4-butanediol di(meth)acrylate, 1,3-butanediol di(meth)acrylate, 1,5-pentanediol di(meth)acrylate, 1,6-hexanediol di(meth)acrylate, 1,10-decanediol di(meth)acrylate, 1,12-dodecanediol di(meth)acrylate, diethylene glycol di(meth)acrylate, triethylene glycol di(meth)acrylate, tetraethylene glycol di(meth)acrylate, poly(ethylene glycol) di(meth)acrylate, dipropylene glycol di(meth)acrylate, tripropylene glycol di(meth)acrylate, tetrapropylene glycol di(meth)acrylate, poly(propylene glycol) di(meth)acrylate neopentyl glycol di(meth)acrylate, cyclohexane dimethanol di(meth)acrylate, bisphenol A di(meth)acrylate, hydrogenated bisphenol A di(meth)acrylate, tricyclodecane dimethanol di(meth)acrylate, trimethylolpropane tri(meth)acrylate, triethylolpropane tri(meth)acrylate, glycerol tri(meth)acrylate, pentaerythritol tetra (meth)acrylate, the alkoxylated (e.g., ethoxylated, propoxylated, preferably ethoxylated) derivatives thereof, and mixtures thereof.

The cross-linker may be an oligomer having 2 to 6 (meth)acrylate groups, in particular an aromatic oligomer having 2 to 6 (meth)acrylate groups, more particularly an aromatic urethane oligomer having 2 to 6 (meth)acrylate groups.

Specific cross-linkers include, for example, 1,6-hexanediol diacrylate, poly(ethylene glycol) dimethacrylate (for example Poly(ethylene glycol) 200 dimethacrylate), ethoxylated trimethylolpropane triacrylate (for example ethoxylated (6) trimethylolpropane triacrylate), 1,10-decanediol diacrylate, ethoxylated Bisphenol A diacrylate (for example ethoxylated (3) Bisphenol A diacrylate, ethoxylated (4) Bisphenol A diacrylate, ethoxylated (10) Bisphenol A diacrylate), an aromatic urethane hexaacrylate oligomer, an aromatic urethane diacrylate oligomer, and an aromatic urethane triacrylate oligomer. Such cross-linkers may be used alone or in combination of two or more.

The cross-linker is typically present in the photo-curable composition in an amount ranging from about 20 wt. % to about 65 wt. %, in particular from about 20 wt. % to about 40 wt. % based on the total weight of the photo-curable composition. In certain embodiments, the cross linker ranges in amounts from about 20 wt. % to about 37.5 wt. %, from about 20 wt. % to about 35 wt. %, from about 20 wt. % to about 32.5 wt. %, from about from about 20 wt. % to about 30 wt. %, from about 20 wt. % to about 27.5 wt. %, from about 20 wt. % to about 25 wt. %, from about 20 wt. % to about 22.5 wt. %, from about 22.5 wt. % to about 40 wt. %, from about 22.5 wt. % to about 37.5 wt. %, from about 22.5 wt. % to about 35 wt. %, from about from about 22.5 wt. % to about 32.5 wt. %, from about 22.5 wt. % to about 30 wt. %, from about 22.5 wt. % to about 27.5 wt. %, from about 22.5 wt. % to about 25 wt. %, from about 25 wt. % to about 40 wt. %, from about 25 wt. % to about 37.5 wt. %, from about 25 wt. % to about 35 wt. %, from about from about 25 wt. % to about 32.5 wt. %, from about 25 wt. % to about 30 wt. %, from about 25 wt. % to about 27.5 wt. %, from about 27.5 wt. % to about 40 wt. %, from about 27.5 wt. % to about 37.5 wt. %, from about 27.5 wt. % to about 35 wt. %, from about from about 27.5 wt. % to about 32.5 wt. %, from about 27.5 wt. % to about 30 wt. %, from about 30 wt. % to about 40 wt. %, from about 30 wt. % to about 37.5 wt. %, from about 30 wt. % to about 35 wt. %, from about from about 30 wt. % to about 32.5 wt. %, from about 32.5 wt. % to about 40 wt. %, from about 32.5 wt. % to about 37.5 wt. %, from about 32.5 wt. % to about 35 wt. %, from about 35 wt. % to about 40 wt. %, from about 35 wt. % to about 37.5 wt. %, and from about 37.5 wt. % to about 40 wt. % based on the total weight of the photo-curable composition. In other embodiments, the cross linker ranges in amounts from about 35 wt. % to about 65 wt. %, from about 40 wt. % to about 65 wt. %, from about 45 wt. % to about 65 wt. %, from about from about 45 wt. % to about 60 wt. %, based on the total weight of the photo-curable composition.

The photo-curable compositions disclosed herein include a plasticizer. The plasticizer functions to improve the stability of the compositions over time and to improve burn out during post-cure heating and to limit the occurrence of cracks. Preferably, the plasticizer is UV-unreactive.

Suitable plasticizers include, but are not limited to, dialkyl phthalates, alkyl phosphates, glycols, (e.g. polyethylene glycol and polypropylene glycol), polyethylene glycol esters, polyethylene glycol ethers, polybutadiene, polybutadiene styrene copolymers, hydrogenated, polyisoprenes, naphthalene, dextrin, phthalates (e.g., dibutylphthalate), polypropylene carbonate, glycerol trioleate, vinyl ethers (e.g., triethylene glycol divinyl ether), linear polyaliphatic hydrocarbons of Mn: 200-2000, aliphatic hydrocarbons, meth(acrylate) copolymers and mixtures thereof. Other useful plasticizers include glycerol.

In some embodiments, the plasticizer is poly(ethylene glycol). Various molecular weight grades of poly(ethylene glycol) can be employed, including PEG 200, PEG 400, PEG 600, PEG 800, and PEG 1000. Preferably, the poly (ethylene glycol) has a molecular weight ($M_w$) of from 400 to 600 g/mol, with 600 g/mol being preferred.

The plasticizer is present in the photo-curable composition in an amount of from about 10 wt. % to about 65 wt. %, in particular from about 20 wt. % to about 65 wt. %, based on the total weight of the photo-curable composition. In certain embodiments, the plasticizer ranges in amounts from about 20 wt. % to about 65 wt. %, 30 wt. % to about 60 wt. %, from about 40 wt. % to about 60 wt. %, from about 45 wt. % to about 60 wt. %, from about 50 wt. % to about 60 wt. %, from about 55 wt. % to about 60 wt. %, from about 58 wt. % to about 60 wt. %, and 60 wt. % based on the total weight of the photo-curable composition. In other embodiments, the plasticizer ranges in amounts from about 20 wt. % to about 60 wt. %, from about 20 wt. % to about 50 wt. %, from about 20 wt. % to about 45 wt. %, from about 20 wt. % to about 40 wt. %, from about 20 wt. % to about 35 wt. %, from about 20 wt. % to about 30 wt. %, from about 20 wt. % to about 25 wt. %, and 25 wt. % based on the total weight of the photo-curable composition.

In one embodiment, the plasticizer is PEG 600 and it is present in the photo-curable composition at from about 20 wt. % to about 60 wt. %, in particular from about 20 wt. % to about 40 wt. % based on the total weight of the photo-curable composition.

The photocurable composition may comprise
from about 5 wt. % to about 40 wt. % based on the total weight of the photo-curable composition of monomer composition a);
from about 20 wt. % to about 65 wt. % based on the total weight of the photo-curable composition of cross-linker b); and
from about 20 wt. % to about 65 wt. % based on the total weight of the photo-curable composition of plasticizer c).

The total amount of a), b) and c) may represent at least 95%, in particular 100%, of the weight of the photo-curable composition.

In one embodiment, the photo-curable composition may comprise
from about 20 wt. % to about 40 wt. % based on the total weight of the photo-curable composition of monomer composition a);
from about 20 wt. % to about 40 wt. % based on the total weight of the photo-curable composition of cross-linker b); and
from about 20 wt. % to about 65 wt. % based on the total weight of the photo-curable composition of plasticizer c).

In another embodiment, the photocurable composition may comprise from about 5 wt. % to about 25 wt. % based on the total weight of the photo-curable composition of monomer composition a);
from about 35 wt. % to about 65 wt. % based on the total weight of the photo-curable composition of cross-linker b); and from about 20 wt. % to about 65 wt. % based on the total weight of the photo-curable composition of plasticizer c).

In certain embodiments the refractive index of the photo-curable composition is up to about 1.8, up to about 1.7, up to about 1.6, up to about 1.55. In other embodiments, the refractive index of the photo-curable composition is from about 1.54 to about 1.8, from about 1.54 to about 1.75, from about 1.54 to about 1.7, from about 1.54 to about 1.65, from about 1.54 to about 1.6, from about 1.6 to about 1.8, from about 1.6 to about 1.75, from about 1.6 to about 1.7, and from about 1.6 to about 1.65. In other embodiments, the refractive index of the photo-curable composition is from about 1.47 to about 1.8, from about 1.47 to about 1.75, from about 1.47 to about 1.7, from about 1.47 to about 1.65, from about 1.47 to about 1.6, from about 1.48 to about 1.8, from about 1.48 to about 1.75, from about 1.48 to about 1.7, or from about 1.48 to about 1.65.

The photo-curable compositions disclosed herein preferably have a viscosity in the range of from about 1 to about 1500 cps at 25° C., and more preferably from about 10 to about 100 cps at 25° C.

The photo-curable compositions disclosed herein provide good decomposition profiles in both oxidizing (e.g., air) and reducing (e.g., nitrogen) atmospheres.

Additional components may be added to the above-disclosed photo-curable compositions, which provides a binding resin, to produce an ink composition suitable for use in a 3D printer, thus, in another embodiment, an ink composition is provided, wherein the ink composition suitable to produce an object when employed in a 3D printer.

The ink composition of the invention comprises:
the photo-curable composition of the invention as defined above;
a photoinitiator;
scaffold particles; and
a dispersant.

The ink composition may comprise from about 20 to about 50 wt. % of photo-curable composition based on the weight of the ink composition. In particular, the amount of photo-curable composition is from about 20 to about 40 wt. %, from about 20 to about 35 wt. %, from about 25 to about 35 wt. %, based on the weight of the ink composition.

Ink compositions disclosed herein include scaffold particles.

The term "scaffold particles" means a particulate material that is capable of being formed into a 3-dimensional structure having high thermal stability and mechanical strength, for example by a thermal treatment such as pyrolysis, sintering, annealing or calcination.

The scaffold particles may be selected from the group consisting of a metallic powder, a ceramic powder, graphite powder, graphene powder, diamond powder, carbide powder, silicide powder, nitride powder, oxide powder, graphene, carbon nanofiber, carbon nanotubes, zirconia, non-ceramic powders and mixtures thereof.

The scaffold particles, also referred to as "powder" may have a number of performance characteristics that are critically important to the proper functioning of a 3D printer. These are: (1) ability to bond into a solid matrix when combined with the jetting fluid; (2) a pore structure that confines the jetting fluid to those regions directly treated by the printer and excluding the jetting fluid from migration outside those regions; (3) ability to flow during the spreading process and form a uniform flat upper surface to receive the jetting fluid during printing; (4) uniformity of the flow as the spreader traverses across regions with variable degrees of hardness, e.g., when the spreading mechanism passes over the interface between solid ("printed") material and loose ("unprinted") material; and (5) ability to provide mechanical support to the printed material through all intermediate stages of the build operation.

The scaffold particles may be metallic particles consisting of pure metal, such as, for example Al, Cu, Fe and Mg.

Preferred scaffold particles are ceramic powders comprising metals and counter ion materials, wherein the counter ion materials are selected from the group consisting of oxide, silicide, nitride, oxynitride, carbonitride, boronitride, and carbide and mixtures thereof and the metals are selected from the group of elements consisting of Al, B, Bi, Ca, Ce, Cr, Cu, K, Fe, Ga, Ge, In, Li, Mg, Mn, Mo, Na, Si, Sn, Sr, Ta, Ti, W, Y and Zr, and mixtures thereof. It is particularly preferred that aluminum oxide, silicon oxide, or a mixed oxide of these oxides is used as the powder. These ceramic materials have proven to be particularly suitable for use in 3D printing. The powder employed preferably has a grain size within a range of 0.1 to 500 μm, and particularly in a range of 1 to 100 μm. This avoids excessively high surface roughness in the article.

Compositions of the present invention are suitable for use with ceramics with a high refractive index such as, for example, zirconia (RI=2.16 or higher).

The ceramic powder is preferably used in an amount of from about 10 to about 80 wt. % of the ink composition, more preferably from about 30 to about 80 wt. % of the ink composition. Typically, the amount of powder/particles is the remainder after the other ingredients have been added to make up 100 wt. %.

In one embodiment, the ink composition comprises from about 50 to about 80 wt. %, from about 55 to about 80 wt. %, from about 55 to about 75 wt. %, from about 60 to about 75 wt. %, from about 65 to about 75 wt. % of scaffold particles, based on the weight of the ink composition.

Ink compositions disclosed herein include a dispersant. The dispersant functions to suspend the particles and prevent settling or agglomeration.

In certain embodiments, the dispersants may have a polyethyleneimine skeleton as principal chain and 15 polypropylene glycol units as side chain on an average and 2 ethylene glycol units on an average in four side chains. Such a structure affords excellent compatibility between the principal chain and ceramic filler particles and a good compatibility with the monomers and plasticizers used. Furthermore such a dispersant affords excellent dispersion and stabilization of the particles. In addition, the above dispersant is liable to be decomposed to its polyether skeleton during the burning at low temperature and organic matters are less liable to remain, so that the satisfactory properties are obtained after sinterification of the ceramic.

Any suitable dispersant can be used as long as it is effective for suspending the ceramic or metallic powders. These include, for example, the following dispersants.
Alkylolammonium salts of copolymers with acidic groups are offered for example by Byk Chemie GmbH under the trade name Disperbyk 154, Disperbyk 180 or Disperbyk 190$^{th}$;
Sorbitan esters, polyalkylene glycol, photo reactive material, such as polycarboxylic acids (Cations and Flowlen (G-700));
Phosphoric esters;
Macropolydispersants and a poly(ethyl)oxy quaternary ammonium salts;
Non-limiting examples of suitable dispersants include polyacrylic dispersants, polyvinylpyrrolidone dispersants, polyoxyethylene glycol dispersants, and polyether dispersants based on oxyalkylated monols, for example nonylphenol oxyethylates. DARVAN® 821A, available from R. T. Vanderbilt, and PVP K-15, available from I.S.P. Technologies, are examples of polyvinylpyrrolidone dispersants, which may be added to aqueous ceramic dispersions in the form of 60 weight percent and 40 weight percent solutions, respectively. For diacrylate dispersions, TRITON® X-100, an ethoxylated nonylphenol, available from the Union Carbide Corporation, has been found satisfactory. Polyacrylic acid and polymethacrylic acid salts are also suitable for aqueous systems. DARVAN® C is an example of an ammonium polyacrylate salt which is suitable;

Phosphoric esters are also good dispersants for the present application (Beycostat C213 from CECA);

Amine dispersants such as HYPERMER KD-2 sold by ICI Americas or a fatty acid derivative such as TEXAPHOR 963 sold by Henkel;

Polymethacrylic acid dispersants;

Polyallyamine dispersants;

Solsperse 39000 (principal chain: polyethyleneimine skeleton, side chain: having 6 valerolactone units on an average and 6 caprolactone units on an average in three side chains, manufactured by Lubrizol Corporation;

Solsperse 71000 (principal chain: polyethyleneimine skeleton, side chain: having 15 polypropylene glycol units on an average and 2 ethylene glycol units on an average in four side chains, manufactured by Lubrizol Corporation;

Mariarim AAB-0851 (principal chain: maleic anhydride skeleton, side chain: polyether skeleton, manufactured by NOF CORPORATION;

Solsperse 41000 (principal chain: polyether skeleton, manufactured by Lubrizol Corporation;

Ajisper PB-821 (principal chain: polyacrylamine skeleton, side chain: polyester skeleton, side chain number: 3 chains, having 16 caprolactone derivative units on an average, manufactured by Ajinomoto Co., Inc.);

Mariarim AAB-0851 (principal chain: maleic anhydride skeleton, side chain: polyether skeleton (propylene glycol unit), manufactured by NOF CORPORATION);

EFKA 4010 (principal chain: tolylenediisocyanate skeleton, side chain: polyether skeleton, having 2 polyethylene glycol units in three side chains and 3 caprolactone units in one side chain, manufactured by Efka Chemicals B.V.);

Solsperse 8200 (principal chain: polyamide skeleton, containing polypropylene glycol units in a side chain, comb type structure containing a basic functional group, manufactured by Lubrizol Corporation);

Disperbyk-9076 (principal chain: polyamine skeleton, containing polyether units in a side chain, highly branched structure containing a basic functional group, manufactured by BYK Chemie A.G.);

Disperbyk-145 (principal chain: polyamine skeleton, containing polyether units in a side chain, highly branched structure containing a basic functional group, manufactured by BYK Chemie A.G.);

BCA (butylcarbitol acetate);

Solsperse 16000 (principal chain: polyethyleneimine skeleton, side chain: 12-hydroxystearic ester, manufactured by Lubrizol Corporation);

Oleylamine;

Colorburst 2176 (succinic anhydride, manufactured by Lubrizol Corporation); and

Disperbyk-116 (acryl dispersant comprising butyl acrylate and butyl methacrylate, manufactured by BYK Chemie A.G.).

Dispersants with steric or electrosteric stabilization mechanisms are preferred.

The inorganic dispersant applicable to embodiments of the present invention comprises: aluminum oxide (trade name: SpectrAL®51, SpectrAL®81, SpectrAL® 100, all manufactured by Cabot Corporation); aluminum oxide (trade names: AEROXIDE® AlUC130, AEROXIDE® AluC, AEROXIDE® Aluc 805, all manufactured by Evonick Degussa Company); silicon dioxide (trade names: HDK® V15, HDK® N20, HDK® C10, A200, all manufactured by Cabot Corporation); silicon dioxide (trade names: TS-100, A-200, OK500, OK 607, all manufactured by Cabot Corporation).

The polymer dispersant applicable to embodiments of the present invention comprises, but is not limited to: BYK 163, BYK180, BYK2009, BYK2155 (manufactured by BYK Chemical Company in Germany); Solsperse 24000, Solsperse 32000, Solsperse 36000, Solsperse 39000, Solsperse 71000 (manufactured by Lubrizol Chemical Company in U.S.A.); Dispers 610, Dispers 630, Dispers 650, Dispers 655 (manufactured by Evonick Degussa in Germany).

In certain embodiments, the dispersant is selected from the group consisting of alkylolammonium salts of copolymers with acidic groups, sorbitan esters, polyalkylene glycols, phosphoric ester, poly(ethyl)oxy quaternary ammonium salt, polyacrylic dispersants, polyvinylpyrrolidone dispersants, polyoxyethylene glycol dispersants, and polyether dispersants based on oxyalkylated monols.

The dispersant is preferably used in an amount of from about 0.2 to about 4.0 wt. % based on the weight of the ink composition. In particular, the amount of dispersant is from about 0.5 to about 3 wt. %, from about 0.8 to about 2.5 wt. %, from about 1 to about 2.0 wt. %, based on the weight of the ink composition.

One skilled in the art, however, would understand that the percent of dispersant employed is typically dependent on the size and loading of the ceramic powder employed, taking into consideration the surface area of the particle and the dosage level, which is typically 2.5 mg of active dispersant per square meter of ceramic surface area.

Ink compositions disclosed herein include a photo-initiator. The photo-initiator functions to generate free radicals under light exposure from light having a wavelength from about 200 nm to about 500 nm, for example, which initiates and propels the polymerization of the high refractive index monomers and cross-linkers. Any known photo-initiator may be used alone or in combination of two or more.

The photo-initiator is not particularly limited as long as it can initiate photopolymerization. Examples thereof that can be used include benzoin ether-based photopolymerization initiator, acetophenone-based photopolymerization initiator, α-ketol-based photopolymerization initiator, aromatic sulfonyl chloride-based photopolymerization initiator, photoactive oxime-based photopolymerization initiator, benzoin-based photopolymerization initiator, benzyl-based photopolymerization initiator, benzophenone-based photopolymerization initiator, ketal-based photopolymerization initiator, thioxanthone-based photopolymerization initiator, acylphosphine oxide-based photopolymerization initiator, and the like.

Specific examples of the benzoin ether-based photoinitiator include benzoin methyl ether, benzoin ethyl ether, benzoin propyl ether, benzoin isopropyl ether, benzoin isobutyl ether, 2,2-dimethoxy-1,2-diphenylethan-1-one (trade name: IRGACURE 651, manufactured by BASF), anisoin methyl ether, and the like. Examples of the acetophenone-based photopolymerization initiator include 1-hydroxycyclohexyl phenyl ketone (trade name: IRGACURE 184, manufactured by BASF), 4-phenoxydichloroacetophenone, 4-t-butyl-dichloroacetophenone, 1-[4-(2-hydroxyethoxy)-phenyl]-2-hydroxy-2-methyl-1-propan-1-one (trade name: IRGACURE 2959, manufactured by BASF), 2-hydroxy-2-methyl-1-phenyl-propan-1-one (trade name: DAROCUR 1173, manufactured by BASF), methoxyacetophenone, and the like.

Examples of the α-ketol-based photo-initiator include 2-methyl-2-hydroxypropiophenone, 1-[4-(2-hydroxyethyl)-phenyl]-2-hydroxy-2-methylpropan-1-one, and the like.

Examples of the aromatic sulfonyl chloride-based photo-initiator include 2-naphthalene sulfonyl chloride and the like.

Examples of the photoactive oxime-based photo-initiator include 1-phenyl-1,2-propanedione-2-(O-ethoxycarbonyl)-oxime, and the like.

Examples of the benzoin-based photo-initiator include benzoin and the like.

Examples of the benzyl-based photo-initiator include benzyl and the like.

Examples of the benzophenone-based photo-initiators include benzophenone, benzoylbenzoic acid, 3,3'-dimethyl-4-methoxybenzophenone, polyvinyl benzophenone, α-hydroxycyclohexyl phenyl ketone, and the like.

Examples of the ketal-based photo-initiator include benzyl dimethyl ketal and the like.

Examples of the thioxanthone-based photo-initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone and the like.

Examples of the acylphosphine oxide-based photo-initiator include bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropan-1-yl)phosphine oxide, bis(2,6-dimethoxybenzoyl)-(1-methylpropan-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropan-1-yl)phosphine oxide, bis(2-methoxybenzoyl)(1-methylpropan-1-yl)phosphine oxide, bis(2,6-diethoxybenzoyl)(2-methylpropan-1-yl)phosphine oxide, bis(2,6-diethoxybenzoyl)(1-methylpropan-1-yl)phosphine oxide, bis(2,6-dibutoxybenzoyl)(2-methylpropan-1-yl)phosphine oxide, bis(2,4-dimethoxybenzoyl)(2-methylpropan-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, Bis(2,4,6-trimethylbenzoyl)-phenylphosphineoxide (IRGACURE™ 819), and the like.

In certain embodiments, the photo-initiator is selected from the group consisting of diphenyl(2,4,6-trimethylbenzoyl)phosphine oxide (TPO), Bis(2,4,6-trimethylbenzoyl)-phenylphosphineoxide, 2-hydroxy-2-methyl-1-phenyl-1-propane (DAROCUR™ 1173), benzophenone (BP) and the like.

The content of the photo-initiator is not particularly limited, but is preferably 0.01 to 5 parts by weight, more preferably 0.05 to 3 parts by weight, furthermore preferably 0.05 to 2.5 parts by weight, and particularly preferably 0.1 to 2 part by weight, based on 100 parts by total weight of the photo-curable composition described above.

Other additives such as surfactants, pH adjustors, emulsifiers, suspending agents, defoamers, preservatives, drying delay agents, additives for controlling rheological properties, wetting agents, antioxidants, UV absorbers (e.g., benetex mayzo OB+, 2,2'-(2,5-thiophenediyl)bis(5-tert-butyl-benzoxazole), bromothymol blue, and 3',3"-Dibromothymolsulfonphthalein), light stabilizers or a combination thereof can be included in the ink composition, by way of example. These additives, if included, are typically present in within a range of 0.05 to 2% by weight based on the weight of the ink composition.

The photo-curable ink composition may comprise:
from about 20 wt. % to about 50 wt. % based on the total weight of the ink composition of the photo-curable composition;
from about 0.01 wt. % to about 5.0 wt. % based on the total weight of the ink composition of the photo-initiator;
from about 50 wt. % to about 80 wt. % based on the total weight of the ink composition of the scaffold particles; and
from about 0.2 wt. % to about 4.0 wt. % based on the total weight of the ink composition of the dispersant
from about 0 wt. % to about 2.0 wt. % based on the total weight of the ink composition of additives.

The amount of photo-curable composition, photo-initiator, scaffold particles, dispersant and additives may represent at least 95%, in particular 100%, of the weight of the ink composition.

The compositions of the photo-curable resin composition described above is also to some extent dependent on the powder employed. In one embodiment, an ink comprises a photo-curable composition comprising 8.9 wt. % of a plasticizer (PEG 600), 31.25 wt. % of a cross-linker (1,6-hexanediol diacrylate), 31.25 wt. % of a high refractive index monomer (CD590) based on the weight of the photo-curable composition. The ink further comprises and about 1.4 wt. % of dispersants such as, for example, Solsperse 71000 and Evonik Disperse 656, for a loading of 68 wt. % of alumina powder (i.e., preloaded) based on the weight of the ink composition. The amount of photo-curable composition in the ink is about 28.5 wt. % based on the weight of the ink composition.

To prepare the compositions disclosed herein, the photo-curable composition (resin), the dispersant, and any additional component (other than the powder) may be mixed together at about 60° C. on rollers overnight. The ceramic powder may then be added at 10 wt. % by 10 wt. % using a high shear mixer at 500 rpm or a ball milling device. Mixing time is directly related to the nature of the ceramic and the final amount desired in the formulation. Viscosity measurements can be used to determine whether the particles are sufficiently dispersed.

Variations of this disclosure provide photo-curable resin formulations which may be used for 3D printing (e.g., by stereolithography) of an intermediate structure followed by thermally treating (e.g., by firing or pyrolyzing) to convert the 3D intermediate structure part into a 3D inorganic structure, in particular a 3D ceramic structure.

Variations of the invention enable direct, free-form 3D printing of pre-ceramic polymers which can be converted to dense ceramics, or even fully dense ceramics. The pre-ceramic resin formulations are preferably compatible with stereolithography photopolymerization. The monomers and polymeric systems can be printed into potentially complex 3D shapes. Preferred ink compositions allow the ceramic structures to be formed with high thermal stability and mechanical strength. The disclosed resin formulations can be economically converted into structures that are light-weight, strong, and stiff—but can withstand a high-temperature oxidizing environment. Final interconnected three-dimensional ceramic materials include, but are not limited to, silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), and boron nitride (BN).

Accordingly, the present disclosure also provides a method of making an inorganic structure, in particular a ceramic structure, the method comprising
(i) obtaining a photo-curable ink composition according to the invention;
(ii) polymerizing and 3D-printing (preferably simultaneously) at least a portion of the photo-curable ink composition to generate a pre-inorganic polymer, in particular a pre-ceramic polymer; and
(iii) thermally treating at least a portion of the pre-inorganic polymer, in particular of the pre-ceramic polymer, to produce an inorganic structure, in particular a ceramic structure, wherein the photo-curable ink composition is as defined herein above.

The pre-inorganic polymer may be a structured composite material comprising a polymer and scaffold particles, the polymer being obtained by curing the photo-curable components of the photo-curable ink composition. The inorganic structure may be a structured material obtained by decomposing or transforming at least part of the polymer of the pre-inorganic polymer (for example by thermally decomposing at least part of the polymer in the pre-inorganic polymer) and bonding at least part of the scaffold particles together (for example by pyrolysis, fusing, sintering, annealing, calcination, or another thermal treatment technique). In particular, the pre-inorganic polymer may be a pre-ceramic polymer, i.e. a structured composite material comprising a polymer and ceramic particles. In particular, the inorganic structure may be a ceramic structure when ceramic particles are used as scaffold particles.

The produced inorganic structure, in particular the produced ceramic structure, may be characterized by at least 50% theoretical density, preferably at least 75% theoretical density, and more preferably at least 95% theoretical density.

In various embodiments, the inorganic structure, in particular the ceramic structure, is characterized by a theoretical density of about (or at least about) 60, 65, 70, 75, 80, 85, 90, 91, 92, 93, 94, 95, 96, 97, 98, 99, or 99.5%. In preferred embodiments, without limitation, the inorganic structure, in particular the ceramic structure, is a fully dense monolith.

A method of making a inorganic structure, in particular a ceramic structure, includes printing which includes directing (e.g., jetting) and polymerizing a photo-curable ink composition as disclosed herein. Preferably, the printing/polymerizing step is performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place.

In typical embodiments, the curing or conversion of the photo-curable composition to the pre-inorganic polymer, in particular to the pre-ceramic polymer, includes crosslinking. In some embodiments, while a monomer is being converted to polymer, a gel is formed first, followed by a solid material as the monomer conversion is further increased to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

In some embodiments, sufficient polymerization inhibitor and UV absorber are added to the photo-curable ink composition to confine the polymerization to the laser exposure point and to minimize scatter to maintain fidelity in the features of the printed part. UV light is then scanned across the resin surface to expose a cross section and build up a thin slice of the part to be manufactured. Although in principle any geometry can be fabricated with this approach, the process is slow, because every thin layer has to be exposed separately.

In some embodiments, the photo-initiator generates free radicals under light exposure by one of intramolecular bond cleavage or intermolecular hydrogen abstraction. Typically, the monomer will polymerize when exposed to UV light (wavelengths of 10 nm to 400 nm), although photo-initiators are typically used to initiate polymerization when exposed to other wavelengths, such as in the visible spectrum. In certain embodiments, light exposure is produced from light having one or more wavelengths selected from about 200 nm to about 700 nm, such as about 250, 300, 350, 400, 500, or 600 nm.

Optionally, a thermal post-cure of the 3D polymer is performed, after the 3D printing but prior to the thermal treatment to produce the inorganic structure, in particular the ceramic structure. For example, the 3D polymer may be heated to a temperature of about 60° C. to about 250° C., such as about 10° C. to about 150° C., for a thermal post-cure time of about 10 minutes to about 8 hours, such as about 20 minutes to about 2 hours. Optionally, a thermal initiator is present.

After polymerization, a thermal treatment is then conducted. The direct conversion of a pre-inorganic 3D-printed structure to an inorganic structure, in particular of a pre-ceramic 3D-printed structure to a ceramic structure, may be achieved by pyrolysis, sintering, annealing, calcination, or another thermal treatment technique. The thermal treatment is preferably performed following polymerization and any (optional) thermal post-cure of the 3D polymer. In certain embodiments, the thermal treatment is combined (i.e., overlaps in time and/or temperature) with polymerization, thermal post-cure, or both. It will also be recognized that even when a sequential operation is intended, some amount of inorganic material, in particular ceramic, formation may occur prior to a planned step of thermal treatment, as a result of the intrinsic kinetics and thermodynamics of the reaction system.

Typically, the thermal treatment is based on heating the 3D-printed structure for an extended period of time (such as from 10 minutes to 1 week) under various inert or reactive atmospheres, such as $H_2$, $N_2$, Ar, air, $CH_4$, $C_2H_6$, $C_2H_4$, CO, $CO_2$, or a combination of these gases. The thermal treatment may include heating at a rate of 0.1° C./min to 20° C./min from ambient temperature (e.g. about 25° C.) to anywhere from about from 1000° C. to 2500° C., dwelling at the selected temperature e.g., 1800° C., for at least 15 minutes, and then cooling at a rate of −0.1° C./min to −20° C./min back to ambient temperature.

In some embodiments, a reactive thermal treatment is performed, in which the gas is reactive toward the initial polymer, the final inorganic material, in particular the final ceramic material, or both of these. When the gas is reactive, it may react with a component and cause it to leave the material.

Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 1500° C. The system pressure may also be adjusted to influence the gas atmosphere.

During the thermal treatment, whether an inert or reactive thermal treatment technique is employed, gases escape. Gases are formed during the conversion of the pre-inorganic polymer to the inorganic structure, in particular of the pre-ceramic polymer to the ceramic structure, by decomposition reactions of the polymer, photoinitiator, free-radical inhibitor, and/or 3D-printing resolution agent. The escaping gases or vapors may include (but are by no means limited to) $CH_4$, $H_2$, CO, $CO_2$, $H_2O$, $SO_2$, etc.

The overall mass loss associated with the conversion of the pre-inorganic polymer to the inorganic structure, in particular of the pre-ceramic polymer to the ceramic structure, may vary widely, such as from about 1 wt % to about 90 wt %, e.g., about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Ink compositions disclosed herein are designed to decompose fully or substantially fully during the firing process preceding the sintering. High refractive index monomers, cross-linkers, plasticizers, photo-initiators and additives are specifically selected to provide low remaining ash content during the firing. Photo-curable resin compositions (without the scaffold particles, in particular without the ceramic powder) are expected to decompose progressively, allowing the development of fully sintered inorganic parts, in particular ceramic parts, with as few cracks as possible.

Burning procedure operated under normal or oxidizing atmosphere (e.g., $O_2$) allows a wider range of use concerning the monomers and/or cross-linkers by providing an easier decomposition of the system. In some cases, it also affords the use of a lower amount of plasticizers as the reactive system already decomposes properly without it.

In the presence of neutral or reductive environments (e.g., $N_2$), specific monomers and cross-linkers are preferred due to their lower residual ash content such as the acrylates SR595, SR210, SR238, SR339, and SR602 (all available from Sartomer) and/or higher amounts of plasticizers can be used to improve the overall decomposition process and reduce residual ash content originating from the organic system.

Due to the low viscosity of the monomers and cross-linkers disclosed herein, increasing the amount of plasticizer is expected to increase the viscosity of the ink, reduce the green strength and reactivity, but is not expected to influence the depth of penetration of the light in any negative way.

In some embodiments, the use of higher amount of plasticizer (i.e., over 20%) is preferred to prevent over-reactivity induced by the cross-linkers and monomers and leading to dimensional curling, bending or shrinkage of the printed parts.

A significant amount of plasticizer is recommended to generate dual decomposition of the organic system during the burning, leading to the removal of the plasticizer first, followed by the cross-linkers and monomers and thus reducing the tendency to initiate cracks as can be observed in formulations only comprising monomers and/or cross-linkers.

Typically, the amount of plasticizer is preferred to be lower than 40 wt. % in the final printable ink composition to prevent too significant diminution of the reactivity of the ink and green strength of the part.

Associated with mass loss may be shrinkage of the pre-inorganic polymer, in particular of the pre-ceramic polymer, as it converts to the inorganic structure, in particular to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage. These embodiments tend to produce lower porosity, or no porosity, and therefore higher densities (e.g., fully dense inorganic, in particular ceramic, materials). Finally, in some embodiments, there is little mass loss but shrinkage associated with chemical reactions taking place. These embodiments also tend to produce relatively high densities.

Despite shrinkage, the bulk shape (relative geometry) of the pre-inorganic 3D-printed polymer, in particular of the pre-ceramic 3D-printed polymer, may be preserved in the final inorganic structure, in particular ceramic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage is possible when there is no random fragmentation during conversion of the pre-inorganic polymer to the inorganic structure, in particular of the pre-ceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

When carbon is desired in the ceramic material, the fraction of carbon may be tailored, for example, by adding phenyl groups on the side chain of the polymer or by using a carbon-based crosslinking agent such as divinyl benzene.

The density of the final inorganic part, in particular of the final ceramic part, may vary, as explained above. In general (without limitation), absolute densities ranging from about 0.1 g/cm$^3$ to about 5 g/cm$^3$, such as about 1-3 g/cm$^3$, may be produced. A fully dense inorganic material, in particular a fully dense ceramic, may have a density from about 1 g/cm$^3$ to about 4 g/cm$^3$, for example.

The strength of the final inorganic material, in particular of the final ceramic material, will vary, depending on the initial pre-inorganic, in particular pre-ceramic, resin formulation, as well as the processing parameters. The engineering strength of an inorganic part, in particular of a ceramic part, also will depend on the geometry—such as a microtruss produced by some embodiments employing a self-propagating polymer waveguide technique. It is noted that, for instance, silicon oxycarbide microlattice and honeycomb cellular materials fabricated with the present methods exhibit higher strength than ceramic foams of similar density.

The thermal stability of the final inorganic material, in particular of the final ceramic material, will vary, depending primarily on the initial pre-inorganic, in particular pre-ceramic, resin formulation, as well as the processing parameters. In some embodiments, for example, the inorganic structure, in particular the ceramic structure, is characterized by being stable in the presence of air at a temperature of about 1000° C., 1100° C., 1200° C., 1300° C., 1400° C., 1500° C., 1600° C., 1700° C., or 1800° C.

The final inorganic structure, in particular the final ceramic structure, even when no machining, polishing, bonding, surface finishing, or assembly is required, may be subjected to coloring (e.g., with inks or dyes), stamping, or other non-functional features, if desired.

ASPECTS OF THE INVENTION

1. A photo-curable composition for use in a composition suitable for three-dimensional printing, the photo-curable composition comprising:
   a. a monomer composition comprising at least one monomer having a refractive index of at least 1.5, wherein the at least one monomer is selected from the group consisting of
      i. at least one monomer selected from the group consisting of poly(oxy-1,2-ethanediyl), alpha-(1-oxo-2-propen-1-yl)-omega-(4-(1-methyl-1-phenylethyl) phenoxy)-, N-vinyloxazole, and N-vinylcarbazole,
      ii. at least one acrylate monomer of Formula I

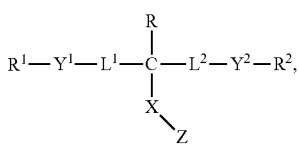

(I)

wherein,
Z is an ethylenically unsaturated group; X is O, S, or NH; L$^1$ and L$^2$ are each independently C$_1$-C$_3$ alkylene, —(C$_1$-C$_3$ alkylene)-S—(C$_1$-C$_3$ alkylene)-, or —(C$_1$-C$_3$ alkylene)-O—(C$_1$-C$_3$ alkylene)-; R is hydrogen or C$_1$-C$_6$ alkyl; R$^1$ and R$^2$ are each independently aryl, aryl (C$_1$-C$_6$ alkylene)-, heteroaryl, or heteroaryl (C$_1$-C$_6$ alkylene)-, each of which group is substituted with 0 to 5 substituents independently selected from halogen, C$_1$-C$_4$ alkyl, C$_1$-C$_4$ alkoxy, (C$_1$-C$_4$ alkyl)S—, C$_1$-C$_4$ haloalkyl, and C$_1$-C$_4$ haloalkoxy; and Y$^1$ and Y$^2$ are each independently O, S, NH, or N, and iii. at least one aryl acrylate monomer of Formula II

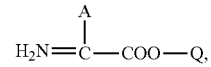

(II)

wherein,
A is H or CH$_3$, and
Q is a moiety that includes at least one substituted or unsubstituted aromatic or at least one substituted or unsubstituted heteroaromatic ring;
b. a cross-linker; and
c. a plasticizer,
wherein the photo-curable composition has a refractive index above about 1.50.

2. The photo-curable composition of Aspect 1 wherein the monomer is at least one selected from the group consisting of poly(oxy-1,2-ethanediyl), alpha-(1-oxo-2-propen-1-yl)-omega-(4-(1-methyl-1-phenylethyl) phenoxy)-, N-vinyloxazole, N-vinylcarbazole, and 2-phenylphenoxyethyl acrylate.

3. The photo-curable composition of Aspect 1 wherein the monomer is at least one acrylate or methacrylate monomer of Formula I

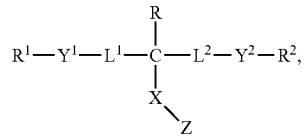

(I)

wherein, Z is an ethylenically unsaturated group; X is O, S, or NH; L1 and L2 are each independently C1-C3 alkylene, —(C1-C3 alkylene)-S— (C1-C3 alkylene)-, or —(C1-C3 alkylene)-O—(C1-C3 alkylene)-; R is hydrogen or C1-C6 alkyl; R$^1$ and R$^2$ are each independently aryl, aryl (C1-C6 alkylene)-, heteroaryl, or heteroaryl (C1-C6 alkylene)-, each of which group is substituted with 0 to 5 substituents independently selected from halogen, C1-C4 alkyl, C1-C4 alkoxy, (C1-C4 alkyl)S—, C1-C4 haloalkyl, and C1-C4 haloalkoxy; and Y1 and Y2 are each independently O, S, NH, or N.

4. The photo-curable composition of Aspect 3 wherein the monomer is selected from the group consisting of 1,3-bis(2-bromophenoxy)propan-2-ylacrylate, 1,3-bis(4-bromophenoxy)propan-2-yl acrylate, 1,3-bis(3-bromophenoxy)propan-2-ylacrylate, 1,3-bis(4-methylphenylthio)-2-propyl acrylate, 1,3-bis(phenoxy)propan-2-ylacrylate, 1,3-bis(2-mercaptobenzothiazoyl)-2-propyl acrylate or 1,3-bis(benzo[d]thiazol-2-ylthio)propan-2-yl acrylate, 1,3-bis(2,4,6-tribromophenoxy)-2-propyl acrylate, 1,3-bis(phenylthio)propan-2-yl acrylate, 1,3-bis(4-bromophenylthio)propan-2-ylacrylate, 1,3-bis(3-bromophenylthio)propan-2-yl acrylate, 1,3-bis(2,4,6-tribromophenylthio)propan-2-yl acrylate, 1,3-di(10H-phenothiazin-10-yl)propan-2-ylacrylate, 1,3-bis(2-(phenylthio)ethylthio)propan-2-ylacrylate, 1-phenoxy-3-(phenylthio)propan-2-ylacrylate, 1-(4-chlorophenoxy)-3-(phenylthio)propan-2-yl acrylate, 1-(4-bromophenoxy)-3-(4-bromophenylthio)propan-2-ylacrylate, 1-(2,4,6-tribromophenoxy)-3-(2,4,6-tribromophenylthio)propan-2-ylacrylate, tetrahydrofurfuryl methacrylate, and 3,3,5 trimethyl cyclohexyl acrylate, 2-phenylthioethyl acrylate, bicyclophenoxyethyl acrylate, o-phenylphenoxyethyl acrylate, and 1-(2,4-dibromophenoxy)-3-(2,4-dibromophenylthio)propan-2-yl acrylate, and the like, including the corresponding unnamed methacrylates and acrylates, and including mixtures thereof.

5. The photo-curable composition of Aspect 1 wherein the monomer is at least one aryl acrylate monomer of Formula II

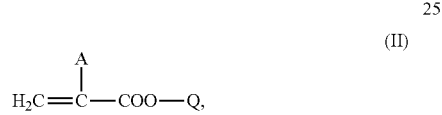

wherein, A is H or CH3, and Q is a moiety that includes at least one substituted or unsubstituted aromatic or at least one substituted or unsubstituted heteroaromatic ring.

6. The photo-curable composition of Aspect 5 wherein Q is selected from the group consisting of ethylene glycol phenyl ether, poly(ethylene glycol phenyl ether acrylate), phenyl, 2-ethylphenoxy, 2-ethylphenoxy, hexylphenoxy, hexylphenoxy, benzyl, 2-phenylethyl, 4-methylphenyl, 4-methylbenzyl, 2-2-methyphenylethyl, 2-3-methylphenylethyl methacrylate, 2-4-methylphenylethyl, 2-(4-propylphenyl) ethyl, 2-(4-(1-methylethyl)phenyl)ethyl, 2-(4-methoxyphenyl)ethyl, 2-(4-chlorophenyl) ethyl, 2-(2-chlorophenyl)ethyl, 2-(3-chlorophenyl)ethyl, 2-(4-chlorophenyl) ethyl, 2-(4-bromophenyl)ethyl, 2-(3-phenylphenyl)ethyl, 2-(4-phenylphenyl) ethyl), and 2-(4-benzylphenyl) ethyl.

7. The photo-curable composition of Aspect 5 wherein the monomer is selected from the group consisting of ethylene glycol phenyl ether acrylate (EGPEA), poly(ethylene glycol phenyl ether acrylate) (polyEGPEA), phenyl methacrylate, 2-ethylphenoxy methacrylate, 2-ethylphenoxy acrylate, hexylphenoxy methacrylate, hexylphenoxy acrylate, benzyl methacrylate, 2-phenylethyl methacrylate, 4-methylphenyl methacrylate, 4-methylbenzyl methacrylate, 2-2-methyphenylethyl methacrylate, 2-3-methylphenylethyl methacrylate, 2-4-methylphenylethyl methacrylate, 2-(4-propylphenyl)ethyl methacrylate, 2-(4-(1-methylethyl) phenyl) ethyl methacrylate, 2-(4-methoxyphenyl)ethyl methacrylate, 2-(4-cyclohexylpheny) ethyl methacrylate, 2-(2-chlorophenyl)ethyl methacrylate, 2-(3-chlorophenyl) ethyl methacrylate, 2-(4-chlorophenyl)ethyl methacrylate, 2-(4-bromophenyl) ethyl methacrylate, 2-(3-phenylphenyl)ethyl methacrylate, 2-(4-phenylphenyl) ethyl methacrylate), 2-(4-benzylphenyl)ethyl methacrylate, 2-phenylphenoxyethyl acrylate, 2-phenoxyethyl acrylate, including the corresponding unnamed methacrylates and acrylates, and mixtures thereof.

8. The photo-curable composition of any of Aspects 1-7 wherein the cross-linker is selected from the group consisting of 1,6 hexanediol diacrylate, PEGDMA, Poly(ethylene glycol) 200 dimethacrylate, ethoxylate (6) trimethylolpropane triacrylate, and 1,10 decanediol diacrylate, and mixtures thereof.

9. The photo-curable composition of Aspects 1-8 wherein the plasticizer is selected from the group consisting of dialkyl phthalates, alkyl phosphates, poly(ethylene glycol), polyethylene glycol esters, polyethylene glycol ethers, polybutadiene, polybutadiene styrene copolymers, hydrogenated, polyisoprenes, glycerol, and mixtures thereof.

10. The photo-curable composition of Aspect 9 wherein the plasticizer is poly(ethylene glycol).

11. The photo-curable composition of Aspect 10 wherein the poly(ethylene glycol) has a Mw of from 200 to 800.

12. The photo-curable composition of Aspect 11 wherein the poly(ethylene glycol) has a Mw of 600.

13. The photo-curable composition of any of Aspects 10-12 wherein the poly(ethylene glycol) is present in the phot-curable composition at from about 50 wt. % to about 60 wt. %.

14. The photo-curable composition of any of Aspects 1-13 wherein the refractive index of the photo-curable composition is from about 1.5 to about 1.8.

15. A photo-curable ink composition suitable for use in 3D printing, the ink composition comprising:
a photo-curable composition comprising:
a. a monomer composition comprising at least one monomer having a refractive index of at least 1.5, wherein the at least one monomer is selected from the group consisting of
i. at least one monomer selected from the group consisting of poly(oxy-1,2-ethanediyl), alpha-(1-oxo-2-propen-1-yl)-omega-(4-(1-methyl-1-phenylethyl) phenoxy)-, N-vinyloxazole, and N-vinylcarbazole,
ii. at least one acrylate monomer of Formula I

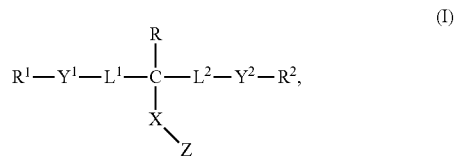

wherein,
Z is an ethylenically unsaturated group; X is O, S, or NH; L1 and L2 are each independently C1-C3 alkylene, —(C1-C3 alkylene)-S— (C1-C3 alkylene)-, or —(C1-C3 alkylene)-O—(C1-C3 alkylene)-; R is hydrogen or C1-C6 alkyl; $R^1$ and $R^2$ are each independently aryl, aryl (C1-C6 alkylene)-, heteroaryl, or heteroaryl (C1-C6 alkylene)-, each of which group is substituted with 0 to 5 substituents independently selected from halogen, C1-C4 alkyl, C1-C4 alkoxy, (C1-C4 alkyl)S—, C1-C4 haloalkyl, and C1-C4 haloalkoxy; and Y1 and Y2 are each independently O, S, NH, or N, and iii. at least one aryl acrylate monomer of Formula II

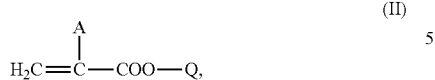

wherein,
A is H or CH$_3$, and
Q is a moiety that includes at least one substituted or unsubstituted aromatic or at least one substituted or unsubstituted heteroaromatic ring;
b. a cross-linker; and
c. a plasticizer, wherein the photo-curable composition has a refractive index above about 1.50;
a photo-initiator;
ceramic or metallic particles; and
a dispersant.

16. The photo-curable ink composition of Aspect 15 wherein the monomer is at least one selected from the group consisting of poly(oxy-1,2-ethanediyl), alpha-(1-oxo-2-propen-1-yl)-omega-(4-(1-methyl-1-phenyl-ethyl)phenoxy)-, N-vinyloxazole, N-vinylcarbazole, and 2-phenylphenoxyethyl acrylate.

17. The photo-curable ink composition of Aspect 15 wherein the monomer is at least one acrylate or methacrylate monomer of Formula I

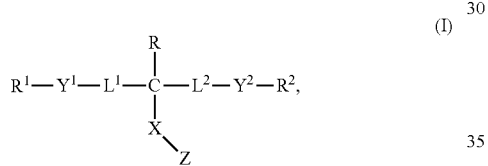

wherein, Z is an ethylenically unsaturated group; X is O, S, or NH; L1 and L2 are each independently C1-C3 alkylene, —(C1-C3 alkylene)-S— (C1-C3 alkylene)-, or —(C1-C3 alkylene)-O—(C1-C3 alkylene)-; R is hydrogen or C1-C6 alkyl; R$^1$ and R$^2$ are each independently aryl, aryl (C1-C6 alkylene)-, heteroaryl, or heteroaryl (C1-C6 alkylene)-, each of which group is substituted with 0 to 5 substituents independently selected from halogen, C1-C4 alkyl, C1-C4 alkoxy, (C1-C4 alkyl)S—, C1-C4 haloalkyl, and C1-C4 haloalkoxy; and Y1 and Y2 are each independently O, S, NH, or N.

18. The photo-curable ink composition of Aspect 17 wherein the monomer is selected from the group consisting of 1,3-bis(2-bromophenoxy)propan-2-yl acrylate, 1,3-bis(4-bromophenoxy)propan-2-yl acrylate, 1,3-bis(3-bromophenoxy)propan-2-yl acrylate, 1,3-bis(4-methylphenylthio)-2-propyl acrylate, 1,3-bis(phenoxy)propan-2-yl acrylate, 1,3-bis(2-mercaptobenzothiazoyl)-2-propyl acrylate or 1,3-bis(benzo[d]thiazol-2-ylthio)propan-2-yl acrylate, 1,3-bis(2,4,6-tribromophenoxy)-2-propyl acrylate, 1,3-bis(phenylthio)propan-2-yl acrylate, 1,3-bis(4-bromophenylthio)propan-2-yl acrylate, 1,3-bis(3-bromophenylthio)propan-2-yl acrylate, 1,3-bis(2,4,6-tribromophenylthio)propan-2-yl acrylate, 1,3-di(10H-phenothiazin-10-yl)propan-2-yl acrylate, 1,3-bis(2-(phenylthio)ethylthio)propan-2-yl acrylate, 1-phenoxy-3-(phenylthio)propan-2-yl acrylate, 1-(4-chlorophenoxy)-3-(phenylthio)propan-2-yl acrylate, 1-(4-bromophenoxy)-3-(4-bromophenylthio)propan-2-yl acrylate, 1-(2,4,6-tribromophenoxy)-3-(2,4,6-tribromophenylthio)propan-2-yl acrylate, tetrahydrofurfuryl methacrylate, and 3,3,5 trimethyl cyclohexyl acrylate, 2-phenylthioethyl acrylate, bicyclophenoxyethyl acrylate, o-phenylphenoxyethyl acrylate, and 1-(2,4-dibromophenoxy)-3-(2,4-dibromophenylthio)propan-2-yl acrylate, and the like, including the corresponding unnamed methacrylates and acrylates, and including mixtures thereof.

19. The photo-curable ink composition of Aspect 15 wherein the monomer is at least one aryl acrylate monomer of Formula II

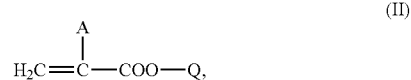

wherein, A is H or CH3, and Q is a moiety that includes at least one substituted or unsubstituted aromatic or at least one substituted or unsubstituted heteroaromatic ring.

20. The photo-curable ink composition of Aspect 19 wherein Q is selected from the group consisting of ethylene glycol phenyl ether, poly(ethylene glycol phenyl ether acrylate), phenyl, 2-ethylphenoxy, 2-ethylphenoxy, hexylphenoxy, hexylphenoxy, benzyl, 2-phenylethyl, 4-methylphenyl, 4-methylbenzyl, 2-2-methyphenylethyl, 2-3-methylphenylethyl methacrylate, 2-4-methylphenylethyl, 2-(4-propylphenyl) ethyl, 2-(4-(1-methylethyl)phenyl)ethyl, 2-(4-methoxyphenyl)ethyl, 2-(4-chlorophenyl) ethyl, 2-(2-chlorophenyl) ethyl, 2-(3-chlorophenyl)ethyl, 2-(4-chlorophenyl) ethyl, 2-(4-bromophenyl)ethyl, 2-(3-phenylphenyl) ethyl, 2-(4-phenylphenyl) ethyl), and 2-(4-benzylphenyl)ethyl.

21. The photo-curable ink composition of Aspect 19 wherein the monomer is selected from the group consisting of ethylene glycol phenyl ether acrylate (EGPEA), poly(ethylene glycol phenyl ether acrylate) (polyEGPEA), phenyl methacrylate, 2-ethylphenoxy methacrylate, 2-ethylphenoxy acrylate, hexylphenoxy methacrylate, hexylphenoxy acrylate, benzyl methacrylate, 2-phenylethyl methacrylate, 4-methylphenyl methacrylate, 4-methylbenzyl methacrylate, 2-2-methyphenylethyl methacrylate, 2-3-methylphenylethyl methacrylate, 2-4-methylphenylethyl methacrylate, 2-(4-propylphenyl)ethyl methacrylate, 2-(4-(1-methylethyl) phenyl)ethyl methacrylate, 2-(4-methoxyphenyl) ethyl methacrylate, 2-(4-cyclohexylpheny) ethyl methacrylate, 2-(2-chlorophenyl)ethyl methacrylate, 2-(3-chlorophenyl) ethyl methacrylate, 2-(4-chlorophenyl) ethyl methacrylate, 2-(4-bromophenyl) ethyl methacrylate, 2-(3-phenylphenyl)ethyl methacrylate, 2-(4-phenylphenyl) ethyl methacrylate), 2-(4-benzylphenyl)ethyl methacrylate, 2-phenylphenoxyethyl acrylate, 2-phenoxyethyl acrylate, and the like, including the corresponding unnamed methacrylates and acrylates, and mixtures thereof.

22. The photo-curable ink composition of any of Aspects 15-21 wherein the cross-linker is selected from the group consisting of 1,6 hexanediol diacrylate, PEGDMA, Poly(ethylene glycol) 200 dimethacrylate, ethoxylate (6) trimethylolpropane triacrylate, and 1,10 decanediol diacrylate, and mixtures thereof.

23. The photo-curable ink composition of any of Aspects 15-22 wherein the plasticizer is selected from the group consisting of dialkyl phthalates, alkyl phosphates, poly (ethylene glycol), polyethylene glycol esters, polyethylene glycol ethers, polybutadiene, polybutadiene styrene copolymers, hydrogenated, polyisoprenes, glycerol, and mixtures thereof.

24. The photo-curable ink composition of Aspect 23 wherein the plasticizer is poly(ethylene glycol).

25. The photo-curable ink composition of Aspect 24 wherein the poly(ethylene glycol) has a Mw of from 200 to 800.

26. The photo-curable ink composition of Aspect 25 wherein the poly(ethylene glycol) has a Mw of 600.

27. The photo-curable ink composition of any of Aspects 24-26 wherein the poly(ethylene glycol) is present in the photo-curable composition at from about 50 wt. % to about 60 wt. %.

28. The photo-curable ink composition of any of Aspects 15-27 wherein the refractive index of the photo-curable ink composition is from about 1.5 to about 1.8.

29. The photo-curable ink composition of any of Aspects 15-28 wherein the ceramic particles are powders comprising metals and counter ion materials, wherein the counter ion materials are selected from the group consisting of oxide, silicide, nitride, oxynitride, carbonitride, boronitride, and carbide and mixtures thereof and the metals are selected from the group of elements consisting of Al, B, Bi, Ca, Ce, Cr, Cu, K, Fe, Ga, Ge, In, Li, Mg, Mn, Mo, Na, Si, Sn, Sr, Ta, Ti, W, Y and Zr, and mixtures thereof.

30. The photo-curable ink composition of any of Aspects 15-29 wherein the dispersant is selected from the group consisting of alkylolammmonium salts of copolymers with acidic groups, sorbitan esters, polyalkylene glycols, phosphoric ester, poly(ethyl)oxy quaternary ammonium salt, polyacrylic dispersants, polyvinylpyrrolidone dispersants, polyoxyethylene glycol dispersants, and polyether dispersants based on oxyalkylated monols.

31. The photo-curable ink composition of any of Aspects 15-30 wherein the photo-initiator is selected from the group consisting of diphenyl(2,4,6-trimethylbenzoyl) phosphine oxide, Bis(2,4,6-trimethylbenzoyl)-phenylphosphineoxide, 2-hydroxy-2-methyl-1-phenyl-1-propane, benzophenone, and mixtures thereof.

32. A method of making a ceramic structure, the method comprising
 (i) obtaining a photo-curable ink composition;
 (ii) polymerizing and 3D-printing (preferably simultaneously) at least a portion of the photo-curable ink composition to generate a preceramic polymer; and
 (iii) thermally treating at least a portion of the preceramic polymer to produce a ceramic structure, wherein the photo-curable ink composition comprises:
  a. from about 20 wt. % to about 40 wt. % based on the total weight of the photo-curable composition of a monomer composition comprising at least one monomer having a refractive index of at least 1.5, wherein the at least one monomer is selected from the group consisting of
   i. at least one monomer selected from the group consisting of poly(oxy-1,2-ethanediyl), alpha-(1-oxo-2-propen-1-yl)-omega-(4-(1-methyl-1-phenylethyl)phenoxy)-, N-vinyloxazole, and N-vinylcarbazole,
   ii. at least one acrylate monomer of Formula I

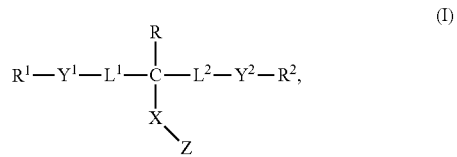

wherein, Z is an ethylenically unsaturated group; X is O, S, or NH; L1 and L2 are each independently C1-C3 alkylene, —(C1-C3 alkylene)-S— (C1-C3 alkylene)-, or —(C1-C3 alkylene)-O—(C1-C3 alkylene)-; R is hydrogen or C1-C6 alkyl; $R^1$ and $R^2$ are each independently aryl, aryl (C1-C6 alkylene)-, heteroaryl, or heteroaryl (C1-C6 alkylene)-, each of which group is substituted with 0 to 5 substituents independently selected from halogen, C1-C4 alkyl, C1-C4 alkoxy, (C1-C4 alkyl)S—, C1-C4 haloalkyl, and C1-C4 haloalkoxy; and Y1 and Y2 are each independently O, S, NH, or N, and
   iii. at least one aryl acrylate monomer of Formula II

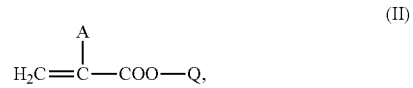

wherein, A is H or $CH_3$, and Q is a moiety that includes at least one substituted or unsubstituted aromatic or at least one substituted or unsubstituted heteroaromatic ring; b. from about 20 wt. % to about 40 wt. % based on the total weight of the photo-curable composition of a cross-linker; and c. from about 20 wt. % to about 65 wt. % based on the total weight of the photo-curable composition of a plasticizer, wherein the photo-curable composition has a refractive index above about 1.50;
  from about 0.01 wt. % to about 5.0 wt. % based on the total weight of the ink composition of a photo-initiator.
  from about 50 wt. % to about 80 wt. % based on the total weight of the ink composition of ceramic or a metallic particles; and
  from about 0.2 wt. % to about 4.0 wt. % based on the total weight of the ink composition of a dispersant.

33. A photo-curable composition for use in a composition suitable for three-dimensional printing, the photo-curable composition comprising:
 a. from about 20 wt. % to about 40 wt. % based on the total weight of the photo-curable composition of a monomer composition comprising at least one monomer having a refractive index of at least 1.5, wherein the at least one monomer is selected from the group consisting of poly(oxy-1,2-ethanediyl), alpha-(1-oxo-2-propen-1-yl)-omega-(4-(1-methyl-1-phenylethyl) phenoxy)-, N-vinyloxazole, N-vinylcarbazole, 2-phenoxyethyl (meth)acrylate, 2-phenylthioethyl (meth)acrylate, phenyl (meth)acrylate, 2-, 3-, and 4-bromophenyl (meth)acrylate, 2,4,6-tribromophenyl (meth)acrylate, tetrabromophenyl (meth)acrylate, pentabromophenyl (meth)acrylate, benzyl (meth)acrylate, 2-, 3-, and 4-bromobenzyl (meth)acrylate, 2,4,6-tribromobenzyl (meth)acrylate, tetrabromobenzyl (meth)acrylate, pentabromobenzyl (meth)acrylate, methyl (meth)acrylate, butyl (meth)acrylate, 2-hydroxyethyl (meth)acrylate, cyclohexyl (meth)acrylate, tetrahydrofurfuryl (meth)acrylate, dicyclopentanyl (meth)acrylate, dicyclopentenyl (meth)acrylate, 3-phenyl-2-hydroxypropyl (meth)acrylate, ortho-biphenyl (meth)acrylate, 3-(2,4-dibromophenyl)-2-hydroxypropyl (meth)acrylate, ethylene glycol phenyl ether acrylate (EGPEA), poly(ethylene glycol phenyl ether acrylate) (polyEGPEA), phenyl methacrylate, 2-ethylphenoxy methacrylate, 2-ethylphenoxy acrylate, hexylphenoxy methacrylate, hexylphenoxy acrylate, benzyl methacrylate, 2-phenylethyl methacrylate, 4-methylphenyl methacrylate, 4-methylbenzyl methacrylate, 2-2-methyphenylethyl methacrylate, 2-3-methylphenylethyl methacrylate, 2-4-methylphenylethyl methacrylate, 2-(4-propylphenyl)ethyl methacrylate, 2-(4-(1-methylethyl) phenyl)ethyl methacrylate, 2-(4-methoxyphenyl)ethyl methacrylate, 2-(4-cyclohexylpheny) ethyl methacrylate, 2-(2-chlorophenyl)ethyl methacrylate, 2-(3-chlorophenyl) ethyl methacrylate, 2-(4-chlorophenyl)ethyl methacrylate, 2-(4-bromophenyl) ethyl methacrylate, 2-(3-phenylphenyl)ethyl methacrylate, 2-(4-phenylphenyl) ethyl methacrylate), 2-(4-benzylphenyl)ethyl methacrylate, 2-phenylphenoxyethyl acrylate, and 2-phenoxyethyl acrylate;
b. from about 20 wt. % to about 40 wt. % based on the total weight of the photo-curable composition of a cross-linker; and
c. from about 20 wt. % to about 65 wt. % based on the total weight of the photo-curable composition of a plasticizer, wherein the photo-curable composition has a refractive index above about 1.50.
34. A photo-curable ink composition suitable for use in 3D printing, the ink composition comprising:
a photo-curable composition comprising:
a. a monomer composition comprising at least one monomer having a refractive index of at least 1.5, wherein the at least one monomer is selected from the group consisting of
i. at least one monomer selected from the group consisting of poly(oxy-1,2-ethanediyl), alpha-(1-oxo-2-propen-1-yl)-omega-(4-(1-methyl-1-phenylethyl) phenoxy)-, N-vinyloxazole, and N-vinylcarbazole,
ii. at least one acrylate monomer of Formula I

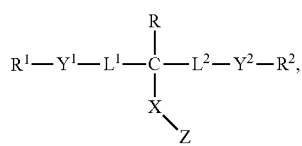

(I)

wherein,
Z is an ethylenically unsaturated group; X is O, S, or NH; L1 and L2 are each independently C1-C3 alkylene, —(C1-C3 alkylene)-S— (C1-C3 alkylene)-, or —(C1-C3 alkylene)-O—(C1-C3 alkylene)-; R is hydrogen or C1-C6 alkyl; $R^1$ and $R^2$ are each independently aryl, aryl (C1-C6 alkylene)-, heteroaryl, or heteroaryl (C1-C6 alkylene)-, each of which group is substituted with 0 to 5 substituents independently selected from halogen, C1-C4 alkyl, C1-C4 alkoxy, (C1-C4 alkyl)S—, C1-C4 haloalkyl, and C1-C4 haloalkoxy; and Y1 and Y2 are each independently O, S, NH, or N, and
iii. at least one aryl acrylate monomer of Formula II

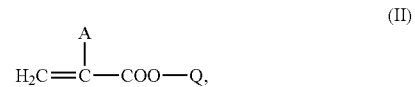

(II)

wherein,
A is H or $CH_3$, and
Q is a moiety that includes at least one substituted or unsubstituted aromatic or at least one substituted or unsubstituted heteroaromatic ring;
b. a cross-linker; and
c. a plasticizer, wherein the photo-curable composition has a refractive index above about 1.50;
a photo-initiator;
particles selected from the group consisting of a metallic powder, a ceramic powder, graphite powder, graphene powder, diamond powder, carbide powder, silicide powder, nitride powder, oxide powder, graphene, carbon nanofiber, carbon nanotubes, zirconia, and mixtures thereof; and
a dispersant.

The methods and compositions disclosed herein will be illustrated in more detail with reference to the following Examples, but it should be understood that the it is not deemed to be limited thereto.

EXAMPLES

Example 1

8.9 wt. % of SR238 (a difunctional, fast reactive, 1,6-hexanediol diacrylate) (available from Sartomer) and 8.9 wt. % of an aromatic, monofunctional acrylate monomer having a refractive index 1.54, sold as CD590 (available from Sartomer) were mixed together with 10.7 wt. % of poly (ethylene glycol) 600, 0.7% of Solsperse® 71000 and 0.7% of Evonik TEGO® Dispers 656 at room temperature for two hours. Panadyne Alumina powder MR-32 was then added progressively, 10 w.t % by 10 w.t % to 68 wt. %, using a high shear mixer at 500 rpm for 2 h following each addition. 2% of TPO, 0.05% of Bromothymol Blue and 0.05% of Benetex OB+ were finally added and the formulation was allowed to mix overnight at room temperature on rollers at 50 rpm.

The formulation was then 3D printed on a 405 nm wavelength open printer (Flashforge Hunter, Autodesk Ember, Anycubic photon, B9 core 550), using an appropriate model with sufficient support surface area and build surface to ensure adhesion between the build platform and the first layer, first layer and burn-in layers, burn-in layers and support layers, support layers and models layers.

The pre-ceramic part was then removed from the printer. The pre-ceramic part was then soaked in IPA for 20 minutes, then rinsed with clean IPA and allowed to dry in air to allow evaporation of the residual solvent and monomers. The pre-ceramic part was then rinsed using water and soap and allowed to dry for an additional 20 minutes. The pre-ceramic part was finally post-cured using a broadband UV Dymax model 5000 Flood oven with a power of 30 mW/cm2 for 20 minutes.

The part was then placed into an appropriate size furnace allowing sufficient temperature to offer sintering of the ceramic powder. Pre-ceramic part was heated at 10° C./min from room temperature to 150° C. then temperature was held for 2 h followed by an additional heating at 3° C./min from 150° C. to 450° C. The temperature was then maintained for 2 h, allowing sufficient time for the binder to decompose. The temperature was then increased to the sintering temperature of the ceramic, in this case 1650° C. and held for an hour (in the case of small part, longer time may be required for bigger parts). The fully sintered ceramic part was then cooled down to room temperature naturally, giving time to the part to relax without creating any cracks.

Although illustrated and described above with reference to certain specific embodiments and examples, embodiments disclosed herein are nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

The invention claimed is:

1. A photo-curable composition for use in a composition suitable for three-dimensional printing, the photo-curable composition comprising:
   a. a monomer composition comprising at least one monomer having a refractive index of at least 1.49, wherein the at least one monomer is selected from the group consisting of
      i. at least one monomer selected from the group consisting of poly(oxy-1,2-ethanediyl), alpha-(1-oxo-2-propen-1-yl)-omega-(4-(1-methyl-1-phenylethyl)phenoxy)-, N-vinyloxazole, and N-vinylcarbazole,
      ii. at least one monomer of Formula I

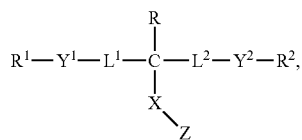

(I)

wherein,
Z is an ethylenically unsaturated group; X is O, S, or NH; $L^1$ and $L^2$ are each independently $C_1$-$C_3$ alkylene, —($C_1$-$C_3$ alkylene)-S—($C_1$-$C_3$ alkylene)-, or —($C_1$-$C_3$ alkylene)-O—($C_1$-$C_3$ alkylene)-; R is hydrogen or $C_1$-$C_6$ alkyl; $R^1$ and $R^2$ are each independently aryl, aryl ($C_1$-$C_6$ alkylene)-, heteroaryl, or heteroaryl ($C_1$-$C_6$ alkylene)-, each of which group is substituted with 0 to 5 substituents independently selected from halogen, $C_1$-$C_4$ alkyl, $C_1$-$C_4$ alkoxy, ($C_1$-$C_4$ alkyl)S—, $C_1$-$C_4$ haloalkyl, and $C_1$-$C_4$ haloalkoxy; and $Y^1$ and $Y^2$ are each independently O, S, NH, or N,
      iii. at least one monomer of Formula II

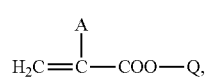

(II)

wherein,
A is H or CH3, and
Q is selected from the group consisting of ethylene glycol phenyl ether, poly(ethylene glycol phenyl ether acrylate), phenyl, hexylphenoxy, hexylphenoxy, 2-phenylethyl, 4-methylphenyl, 4-methylbenzyl, 2-2-methyphenylethyl, 2-3-methylphenylethyl, 2-4-methylphenylethyl, 2-(4-propylphenyl) ethyl, 2-(4-(1-methylethyl)phenyl)ethyl, 2-(4-methoxyphenyl)ethyl, 2-(4-chlorophenyl) ethyl, 2-(2-chlorophenyl)ethyl, 2-(3-chlorophenyl)ethyl, 2-(4-chlorophenyl) ethyl, 2-(4-bromophenyl)ethyl, 2-(3-phenylphenyl)ethyl, 2-(4-phenylphenyl) ethyl), and 2-(4-benzylphenyl)ethyl or Q is a moiety that includes at least one substituted or unsubstituted heteroaromatic ring,
      iv. at least one monomer of formula III,

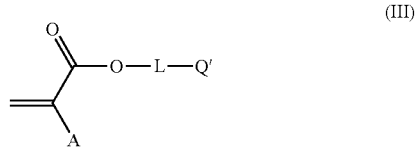

(III)

wherein
A is H or Me,
L is a bond, $C_1$-$C_3$ alkylene or —($CR_cR_d$—$CR'_c$ $R'_d$—$O)_m$;
each $R_c$, $R_d$, $R'_c$ and $R'_d$ is independently H or alkyl;
m is 2 to 10; and
Q' corresponds to one of the following formulae:

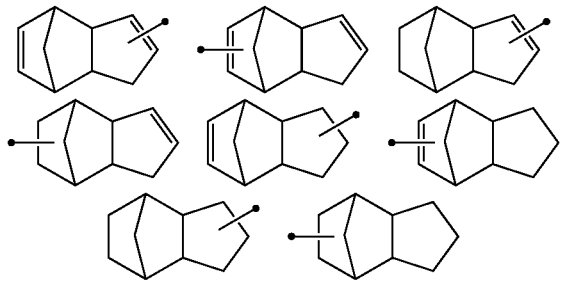

wherein the symbol ● corresponds to the point of attachment to linker L;
   b. a cross-linker; and
   c. a plasticizer.

2. The photo-curable composition of claim 1, wherein the monomer having a refractive index of at least 1.49 is at least one selected from the group consisting of poly(oxy-1,2-ethanediyl), alpha-(1-oxo-2-propen-1-yl)-omega-(4-(1-methyl-1-phenylethyl)phenoxy)-, N-vinyloxazole and N-vinylcarbazole.

3. The photo-curable composition of claim 1, wherein the monomer having a refractive index of at least 1.49 is the at least one acrylate monomer of Formula I wherein Z is acryloyl or methacryloyl.

4. The photo-curable composition of claim 3, wherein the monomer of formula I is selected from the group consisting of 1,3-bis(2-bromophenoxy)propan-2-yl acrylate, 1,3-bis(4-bromophenoxy)propan-2-yl acrylate, 1,3-bis(3-bromophenoxy)propan-2-yl acrylate, 1,3-bis(4-methylphenylthio)-2-propyl acrylate, 1,3-bis(phenoxy)propan-2-yl acrylate, 1,3-bis(2-mercaptobenzothiazoyl)-2-propyl acrylate, 1,3-bis(benzo[d]thiazol-2-ylthio)propan-2-yl acrylate, 1,3-bis(2,4,6-tribromophenoxy)-2-propyl acrylate, 1,3-bis(phenylthio)

propan-2-yl acrylate, 1,3-bis(4-bromophenylthio)propan-2-yl acrylate, 1,3-bis(3-bromophenylthio)propan-2-yl acrylate, 1,3-bis(2,4,6-tribromophenylthio)propan-2-yl acrylate, 1,3-di(10H-phenothiazin-10-yl)propan-2-yl acrylate, 1,3-bis(2-(phenylthio)ethylthio)propan-2-yl acrylate, 1-phenoxy-3-(phenylthio)propan-2-yl acrylate, 1-(4-chlorophenoxy)-3-(phenylthio)propan-2-yl acrylate, 1-(4-bromophenoxy)-3-(4-bromophenylthio)propan-2-yl acrylate, 1-(2,4,6-tribromophenoxy)-3-(2,4,6-tribromophenylthio) propan-2-yl acrylate, and 1-(2,4-dibromophenoxy)-3-(2,4-dibromophenylthio)propan-2-yl acrylate, and mixtures thereof.

5. The photo-curable composition of claim 1, wherein the monomer having a refractive index of at least 1.49 is the at least one monomer of Formula II.

6. The photo-curable composition of claim 5, wherein the monomer of formula II is selected from the group consisting of poly(ethylene glycol) phenyl ether acrylate (polyEG-PEA), phenyl methacrylate, hexylphenoxy methacrylate, hexylphenoxy acrylate, 2-phenylethyl methacrylate, 4-methylphenyl methacrylate, 4-methylbenzyl methacrylate, 2-(2-methylphenyl)ethyl methacrylate, 2-(3-methylphenyl)ethyl methacrylate, 2-(4-methylphenyl)ethyl methacrylate, 2-(4-propylphenyl)ethyl methacrylate, 2-(4-(1-methylethyl)phenyl)ethyl methacrylate, 2-(4-methoxyphenyl)ethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-phenylphenyl)ethyl methacrylate), 2-(4-benzylphenyl)ethyl methacrylate, 2-(phenylphenoxy)ethyl acrylate, 2-phenoxyethyl acrylate, 2-(phenylthio)ethyl (meth)acrylate, (2-phenoxy-2-phenyl) ethyl (meth)acrylate, (2-phenyl-2-phenylthio)ethyl (meth)acrylate, 2-, 3-, and 4-bromophenyl (meth)acrylate, 2,4,6-tribromophenyl (meth)acrylate, tetrabromophenyl (meth)acrylate, pentabromophenyl (meth)acrylate, 2-, 3-, and 4-bromobenzyl (meth)acrylate, 2,4,6-tribromobenzyl (meth)acrylate, tetrabromobenzyl (meth)acrylate, pentabromobenzyl (meth)acrylate, 3-phenyl-2-hydroxypropyl (meth)acrylate, ortho-biphenyl (meth)acrylate, 3-(2,4-dibromophenyl)-2-hydroxypropyl (meth)acrylate, (2-hydroxy-3-phenoxy) propyl (meth)acrylate, and mixtures thereof.

7. The photo-curable composition of claim 1, wherein the monomer having a refractive index of at least 1.49 is the at least one monomer of formula III.

8. The photo-curable composition of claim 7, wherein the monomer having a refractive index of at least 1.49 comprises mono(meth)acrylate of tricyclodecane methanol of formula

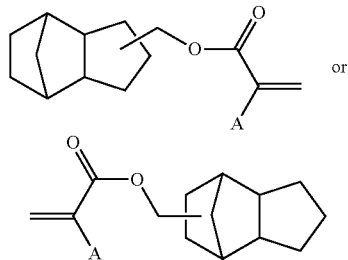

wherein A is H or CH₃.

9. The photo-curable composition of claim 1, wherein the cross-linker has at least two ethylenically unsaturated groups.

10. The photo-curable composition of claim 1, wherein the cross-linker is selected from the group consisting of ethylene glycol di(meth)acrylate, 1,2-propanediol di(meth)acrylate, 1,3-propanediol di(meth)acrylate, 1,4-butanediol di(meth)acrylate, 1,3-butanediol di(meth)acrylate, 1,5-pentanediol di(meth)acrylate, 1,6-hexanediol di(meth)acrylate, 1,10-decanediol di(meth)acrylate, 1,12-dodecanediol di(meth)acrylate, diethylene glycol di(meth)acrylate, triethylene glycol di(meth)acrylate, tetraethylene glycol di(meth)acrylate, poly(ethylene glycol) di(meth)acrylate, dipropylene glycol di(meth)acrylate, tripropylene glycol di(meth)acrylate, tetrapropylene glycol di(meth)acrylate, poly(propylene glycol) di(meth)acrylate, neopentyl glycol di(meth)acrylate, cyclohexane dimethanol di(meth)acrylate, bisphenol A di(meth)acrylate, hydrogenated bisphenol A di(meth)acrylate, tricyclodecane dimethanol di(meth)acrylate, trimethylolpropane tri(meth)acrylate, triethylolpropane tri(meth)acrylate, glycerol tri(meth)acrylate, pentaerythritol tetra (meth)acrylate, an aromatic urethane oligomer having 2 to 6 (meth)acrylate groups, and mixtures thereof.

11. The photo-curable composition of claim 1, wherein the plasticizer is selected from the group consisting of dialkyl phthalates, alkyl phosphates, poly(ethylene glycol), polyethylene glycol esters, polyethylene glycol ethers, polybutadiene, polybutadiene styrene copolymers, polyisoprenes, glycerol, and mixtures thereof.

12. The photo-curable composition of claim 1, wherein the plasticizer is poly(ethylene glycol).

13. The photocurable composition according to 1, wherein the photocurable composition comprises
from about 5 wt. % to about 40 wt. % based on the total weight of the photo-curable composition of monomer composition a);
from about 20 wt. % to about 65 wt. % based on the total weight of the photo-curable composition of cross-linker b); and
from about 20 wt. % to about 65 wt. % based on the total weight of the photo-curable composition of plasticizer c).

14. A photo-curable ink composition suitable for use in 3D printing, the ink composition comprising:
a photo-curable composition as defined in claim 1;
a photo-initiator;
scaffold particles; and
a dispersant.

15. The photo-curable ink composition of claim 14, wherein the scaffold particles are selected from the group consisting of a metallic powder, a ceramic powder, graphite powder, graphene powder, diamond powder, carbide powder, silicide powder, nitride powder, oxide powder, graphene, carbon nanofiber, carbon nanotubes, zirconia, and mixtures thereof.

16. The photo-curable ink composition of claim 14, wherein the photo-initiator is selected from the group consisting of diphenyl(2,4,6-trimethylbenzoyl)phosphine oxide, Bis(2,4,6-trimethylbenzoyl)-phenylphosphineoxide, 2-hydroxy-2-methyl-1-phenyl-1-propane, benzophenone, and mixtures thereof.

17. The photo-curable ink composition of claim 14, wherein the photo-curable ink composition comprises:
from about 20 wt. % to about 50 wt. % based on the total weight of the ink composition of the photo-curable composition;
from about 0.01 wt. % to about 5.0 wt. % based on the total weight of the ink composition of the photo-initiator;

from about 50 wt. % to about 80 wt. % based on the total weight of the ink composition of the scaffold particles; and from about 0.2 wt. % to about 4.0 wt. % based on the total weight of the ink composition of the dispersant.

18. A method of making an inorganic structure, the method comprising
  (i) obtaining a photo-curable ink composition as defined in claim 14;
  (ii) polymerizing and 3D-printing at least a portion of the photo-curable ink composition to generate a pre-inorganic polymer; and
  (iii) thermally treating at least a portion of the pre-inorganic polymer to produce an inorganic structure.

* * * * *